(12) United States Patent
Tsiberidis

(10) Patent No.: US 11,712,923 B2
(45) Date of Patent: *Aug. 1, 2023

(54) SELF-BRACING EMERGENCY WHEEL

(71) Applicant: GV ENGINEERING GMBH, Heimsheim (DE)

(72) Inventor: Konstantin Tsiberidis, Untergruppenbach (DE)

(73) Assignee: GV ENGINEERING GMBH, Heimsheim (DE)

( * ) Notice: Subject to any disclaimer, the term of this patent is extended or adjusted under 35 U.S.C. 154(b) by 834 days.

This patent is subject to a terminal disclaimer.

(21) Appl. No.: 16/626,697

(22) PCT Filed: Jul. 5, 2018

(86) PCT No.: PCT/EP2018/068293
§ 371 (c)(1),
(2) Date: Mar. 31, 2020

(87) PCT Pub. No.: WO2019/008113
PCT Pub. Date: Jan. 10, 2019

(65) Prior Publication Data
US 2020/0223252 A1 Jul. 16, 2020

(30) Foreign Application Priority Data
Jul. 6, 2017 (DE) .......................... 102017115184.2

(51) Int. Cl.
B60B 15/26 (2006.01)
B60B 11/10 (2006.01)

(52) U.S. Cl.
CPC ............ B60B 15/263 (2013.01); B60B 11/10 (2013.01); B60B 2900/731 (2013.01)

(58) Field of Classification Search
CPC ........ B60B 15/26; B60B 15/263; B60B 11/10
See application file for complete search history.

(56) References Cited

U.S. PATENT DOCUMENTS 1,055,372 A 3/1913 Turnbull
3,567,287 A * 3/1971 Nutter ..................... B60B 11/10
301/38.1

(Continued)

FOREIGN PATENT DOCUMENTS

EP 0606946 A1 7/1994
EP 2662222 A1 11/2013
GB 857897 A 1/1961

OTHER PUBLICATIONS

PCT International Search Report and Written Opinion completed by the ISA/EP dated Oct. 11, 2018 and issued in connection with PCT/EP2018/068293.

*Primary Examiner* — Jason R Bellinger
(74) *Attorney, Agent, or Firm* — Barnes & Thornburg LLP

(57) ABSTRACT

An attachment for a vehicle wheel enables driving operation with limited tire function. The attachment may include a base body, a tread surface for contacting a road surface, at least one bracing apparatus configured to engage with a hook portion behind a portion of a rim of the vehicle wheel and a bracing mechanism having a contact portion configured to actuate the bracing apparatus and to bring the hook portion into engagement behind the portion of the upon actuation of the contact portion.

21 Claims, 29 Drawing Sheets

(56) References Cited

U.S. PATENT DOCUMENTS

| | | | | |
|---|---|---|---|---|
| 3,608,970 | A * | 9/1971 | Strumbos | B60C 17/00 |
| | | | | 301/38.1 |
| 3,815,958 | A * | 6/1974 | Dietrich, Sr. | B60B 15/26 |
| | | | | 301/41.1 |
| 5,407,255 | A * | 4/1995 | Feldman | B60B 11/10 |
| | | | | 301/38.1 |
| 6,068,346 | A * | 5/2000 | Pender | B60B 11/10 |
| | | | | 301/40.3 |
| 6,217,125 | B1 * | 4/2001 | Tubetto | B60B 15/26 |
| | | | | 301/40.3 |
| 11,485,170 | B2 * | 11/2022 | Tsiberidis | B60B 11/10 |
| 11,498,359 | B2 * | 11/2022 | Tsiberidis | B60B 15/263 |
| 2020/0086683 | A1 * | 3/2020 | Tsiberidis | B60B 15/263 |
| 2020/0164682 | A1 * | 5/2020 | Tsiberidis | B60B 19/00 |
| 2020/0223250 | A1 * | 7/2020 | Tsiberidis | B60B 15/263 |
| 2021/0039432 | A1 * | 2/2021 | Tsiberidis | B60C 17/04 |
| 2021/0053391 | A1 * | 2/2021 | Tsiberidis | B60B 11/10 |
| 2022/0041011 | A1 * | 2/2022 | Tsiberidis | B60B 11/10 |
| 2022/0348038 | A1 * | 11/2022 | Tsiberidis | B60B 15/263 |

* cited by examiner

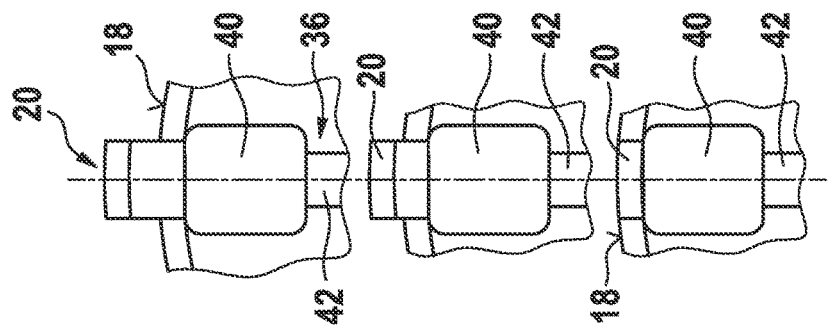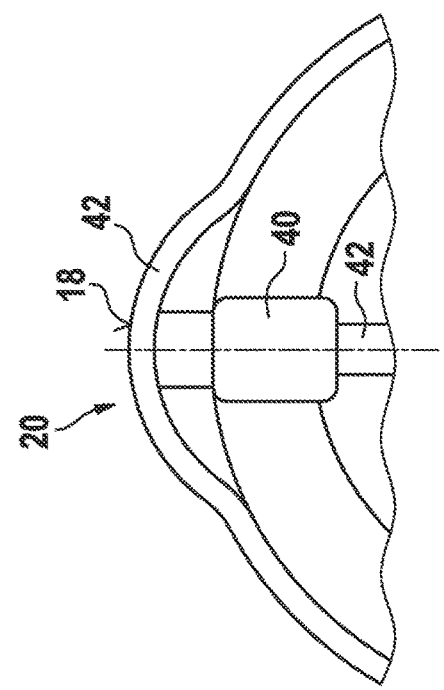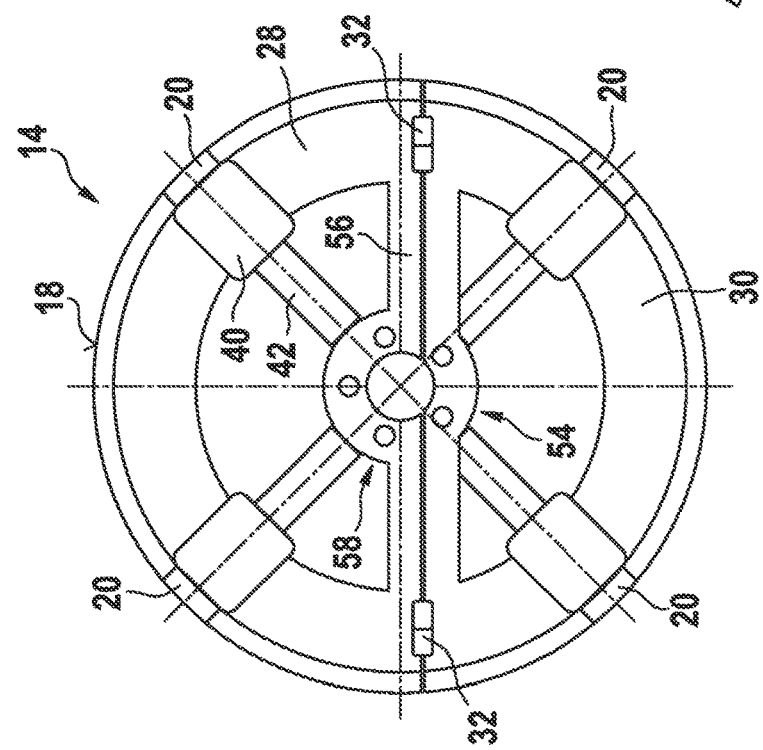

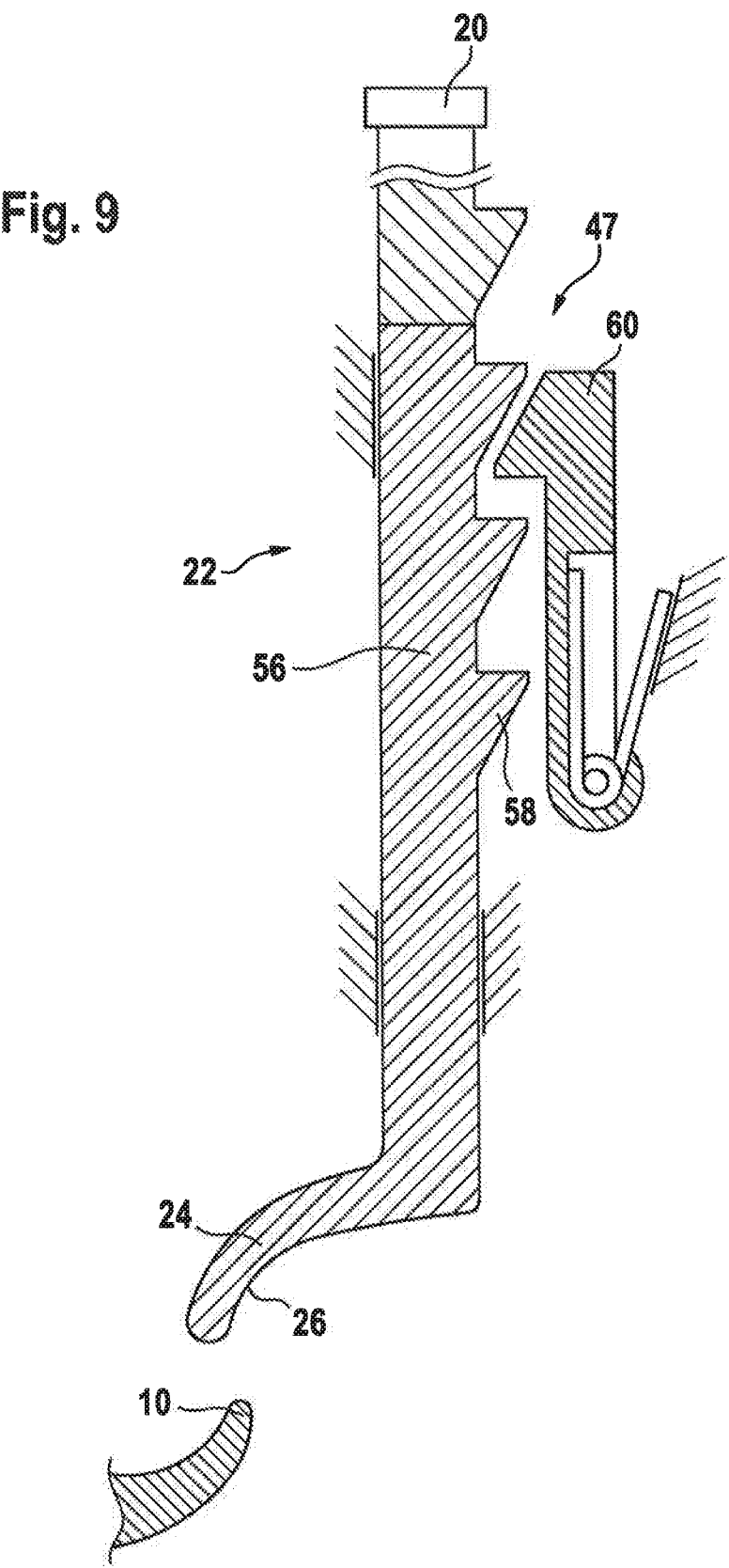

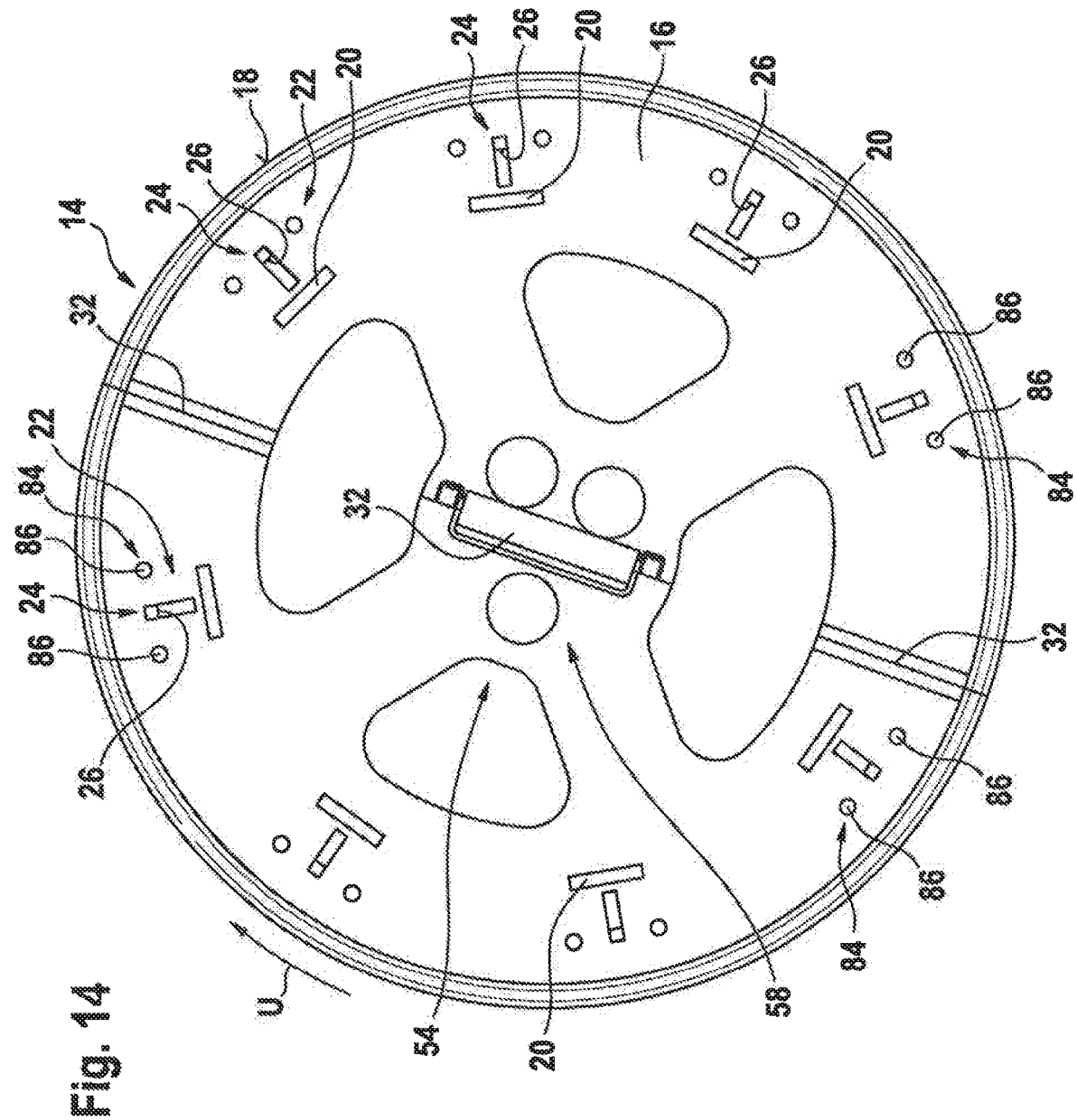

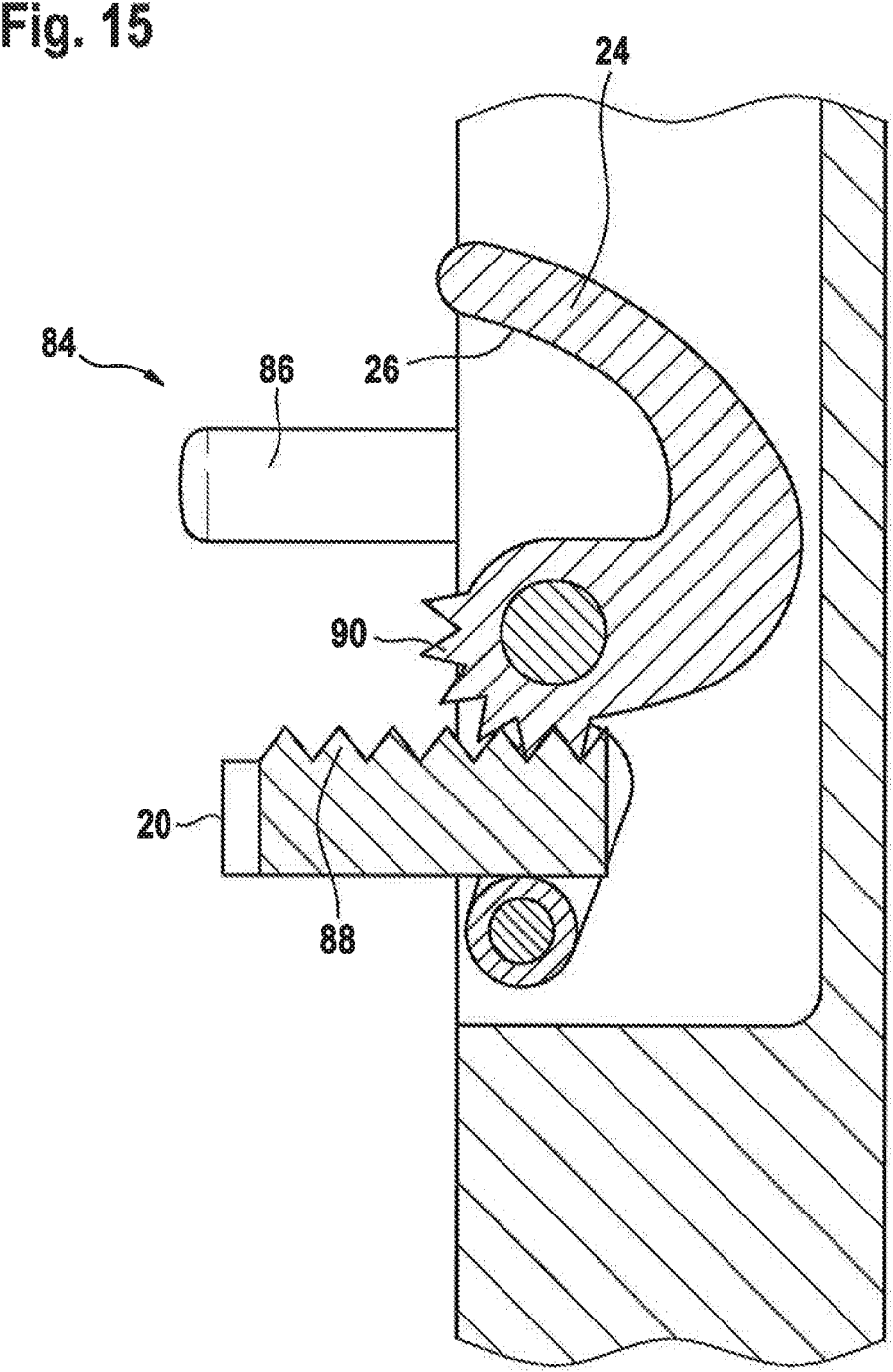

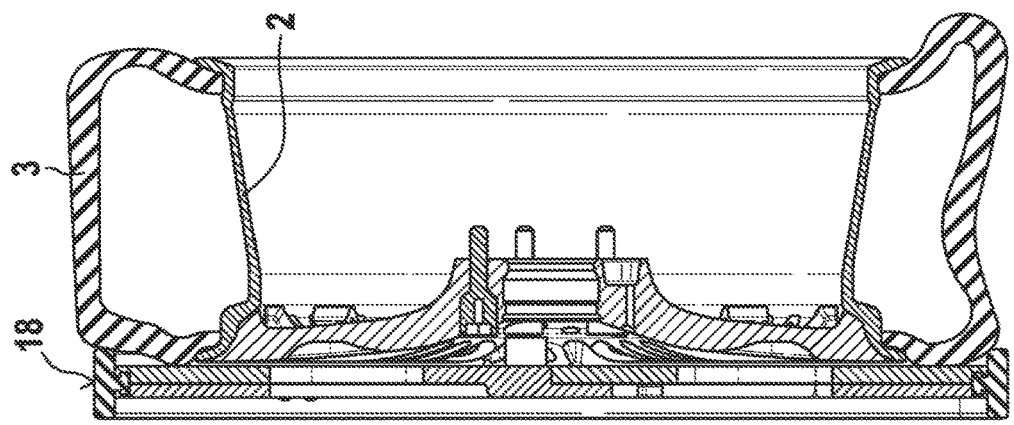
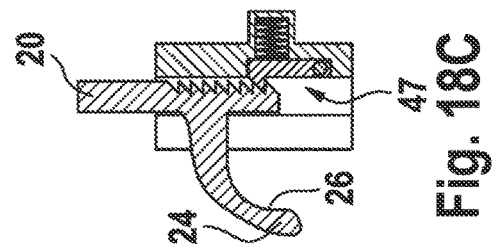
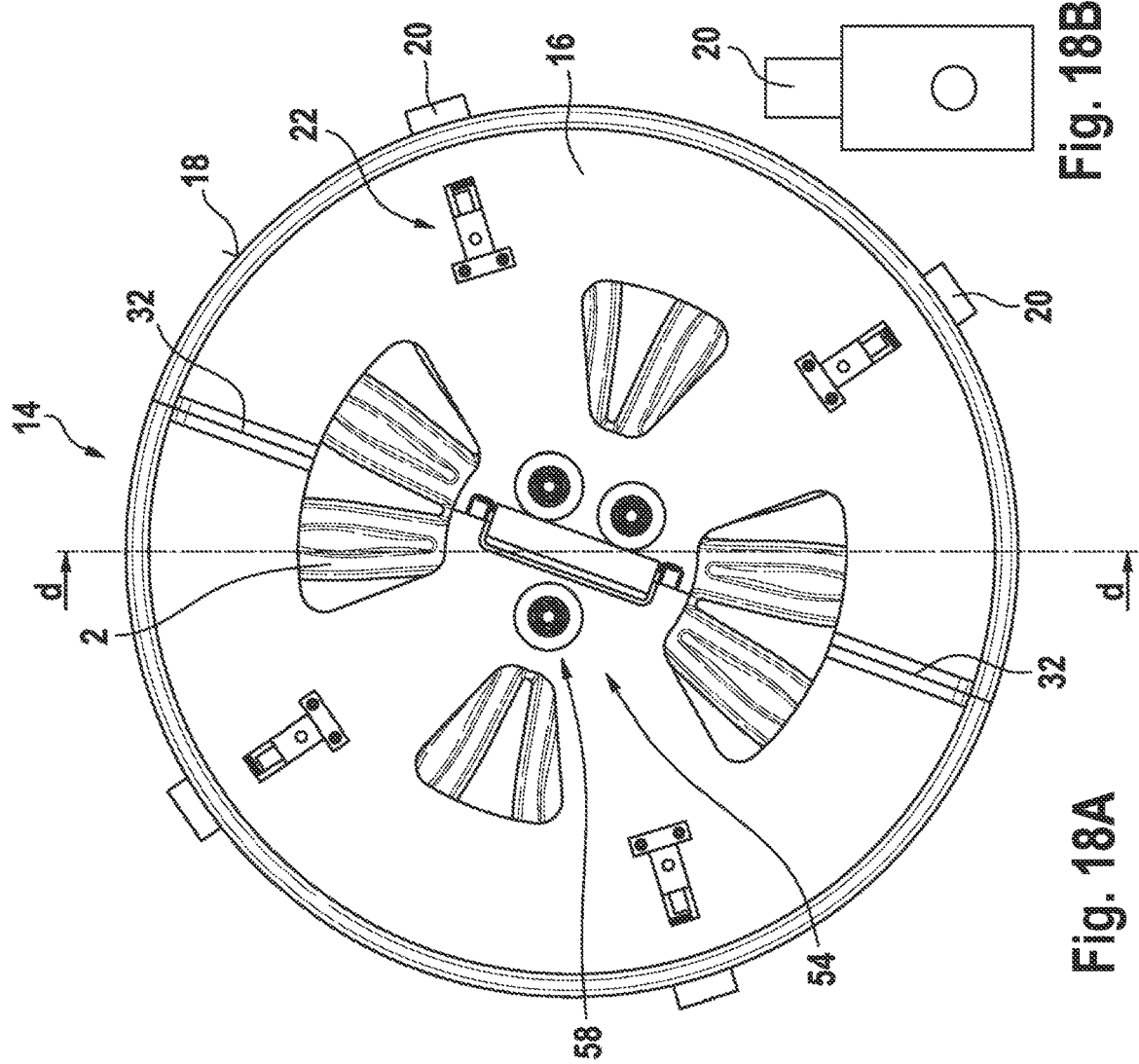
Fig. 18D
Fig. 18C
Fig. 18B
Fig. 18A

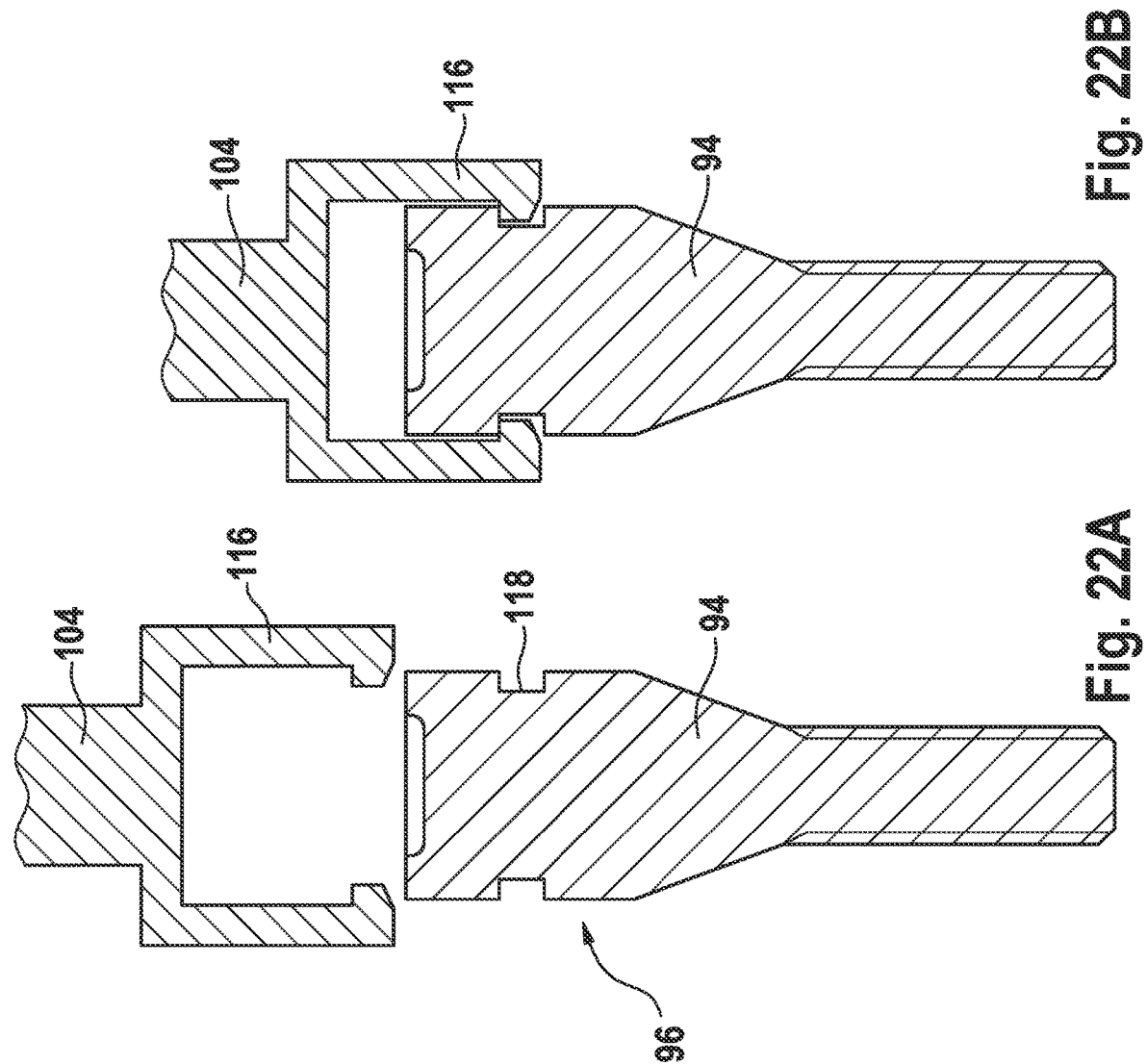

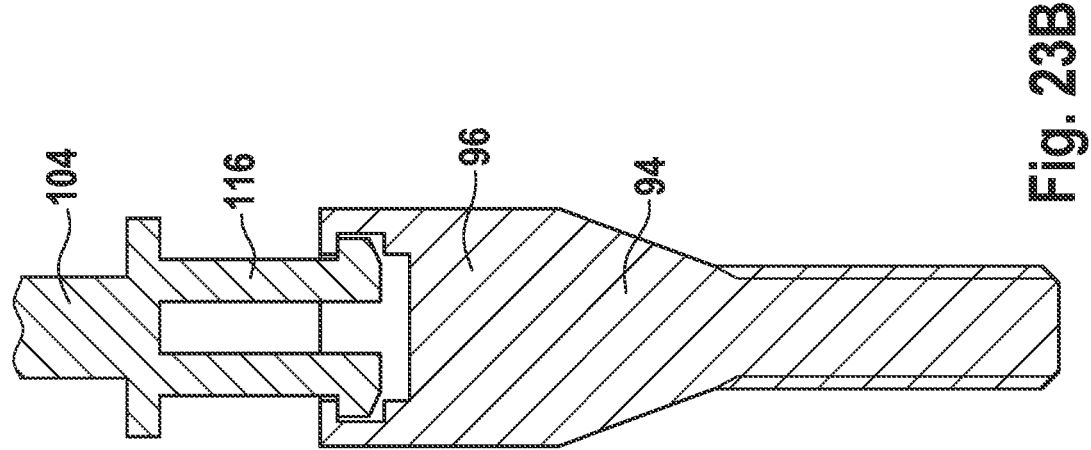
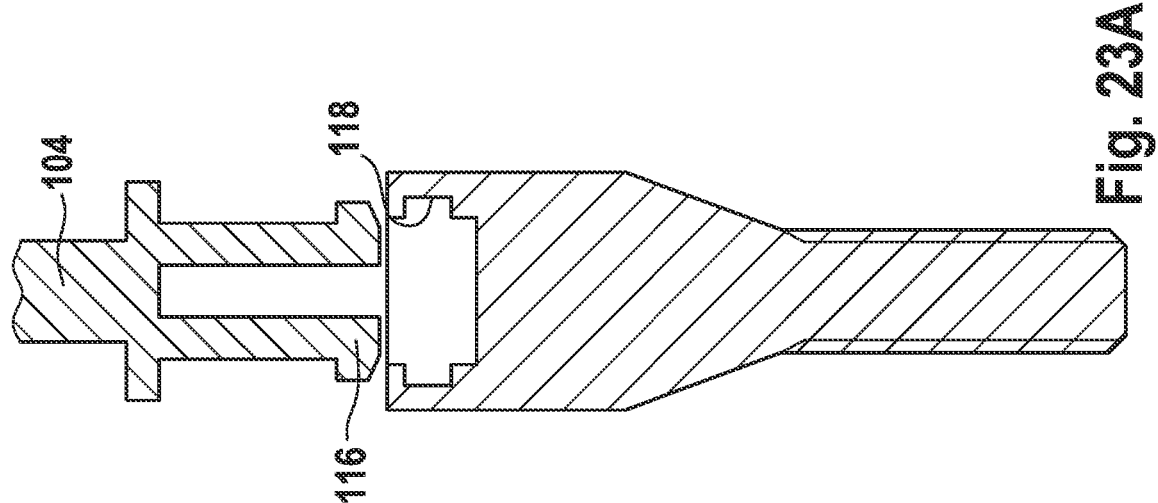

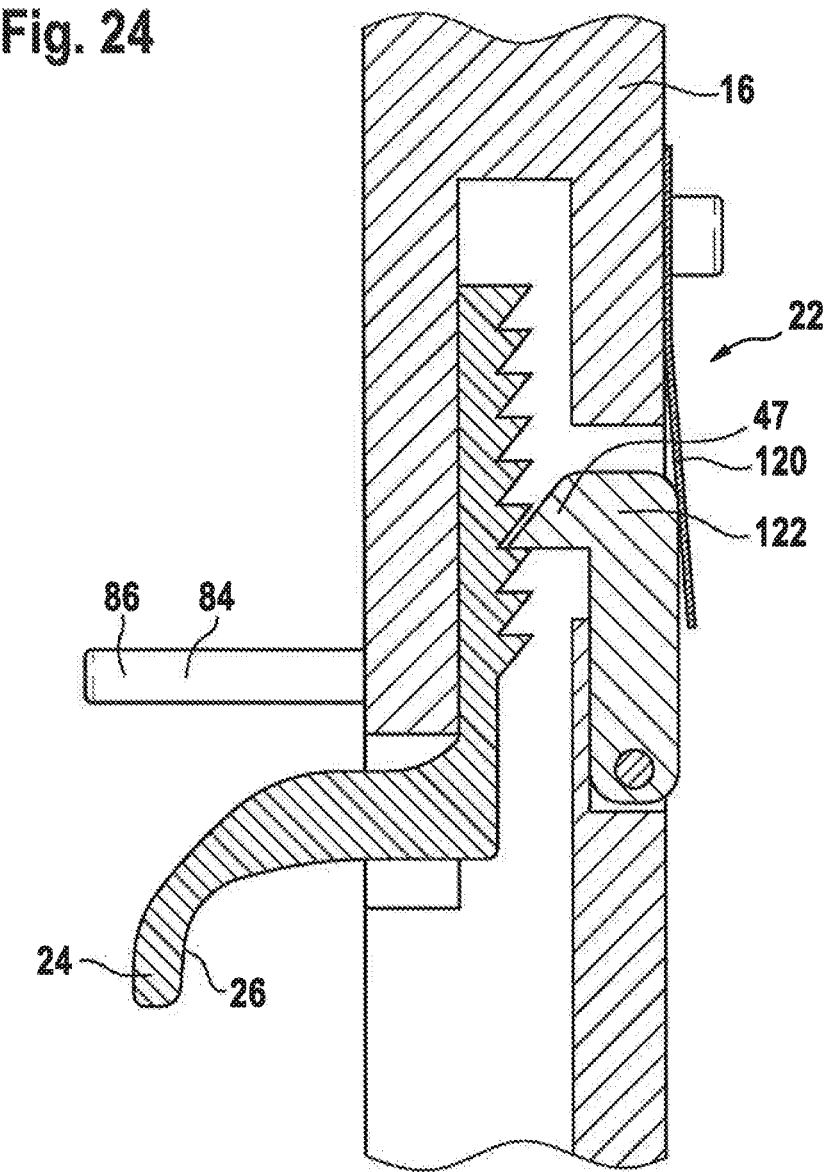

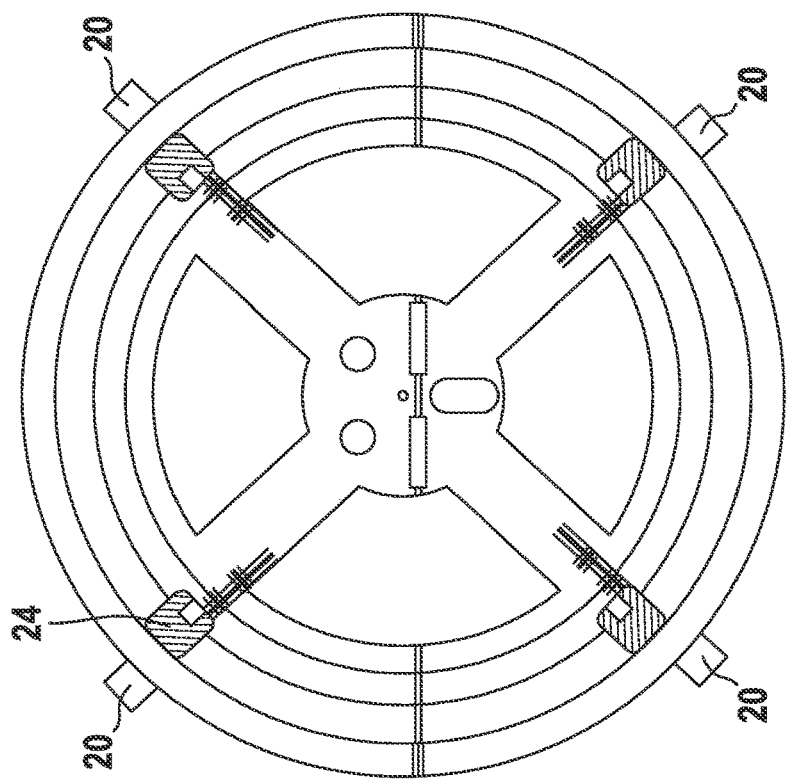
Fig. 25C
Fig. 25B
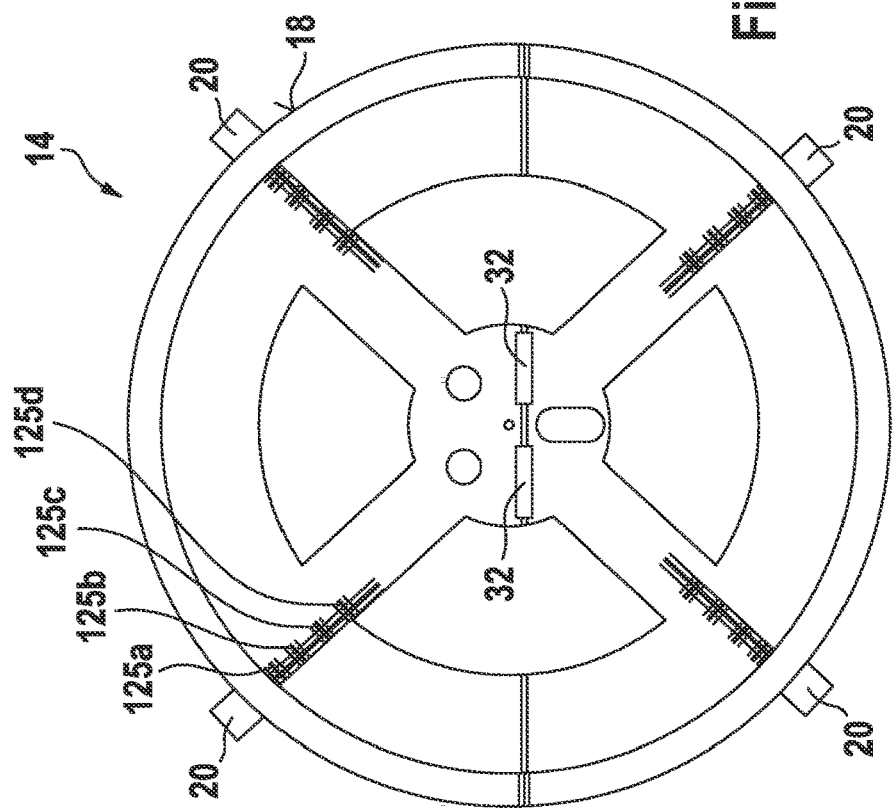
Fig. 25A

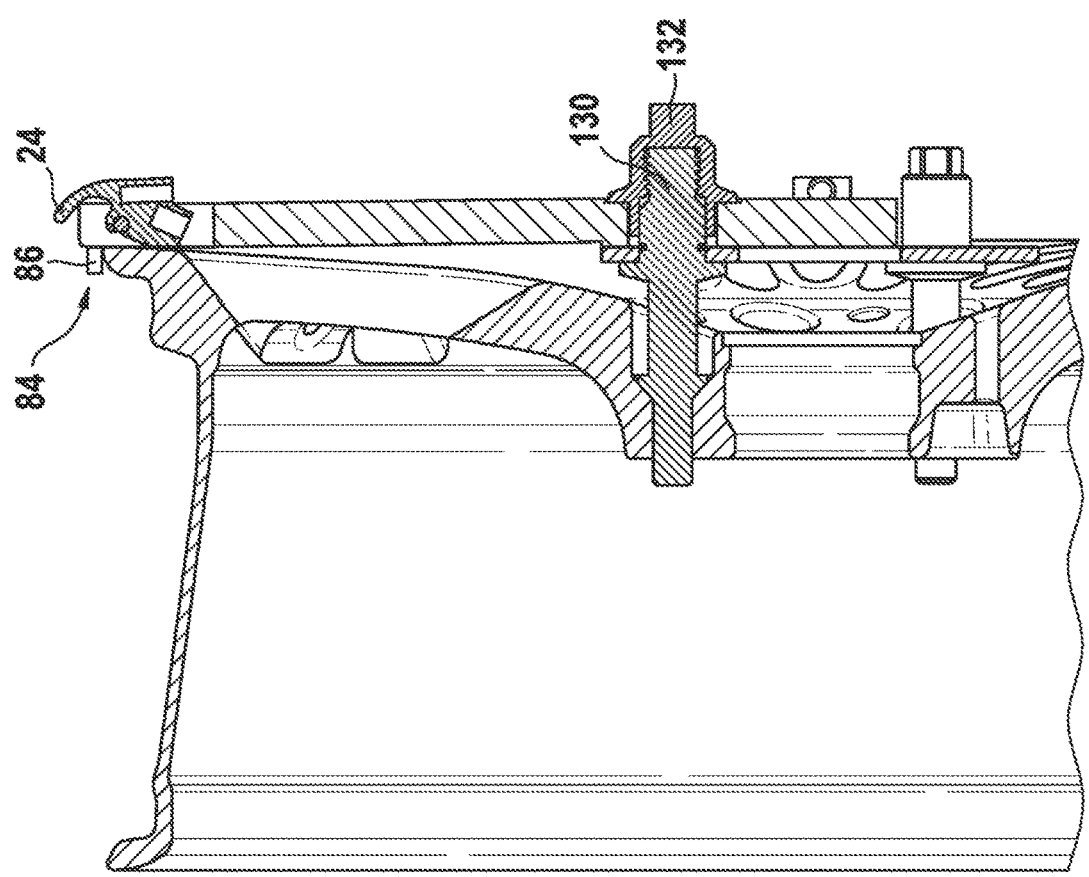
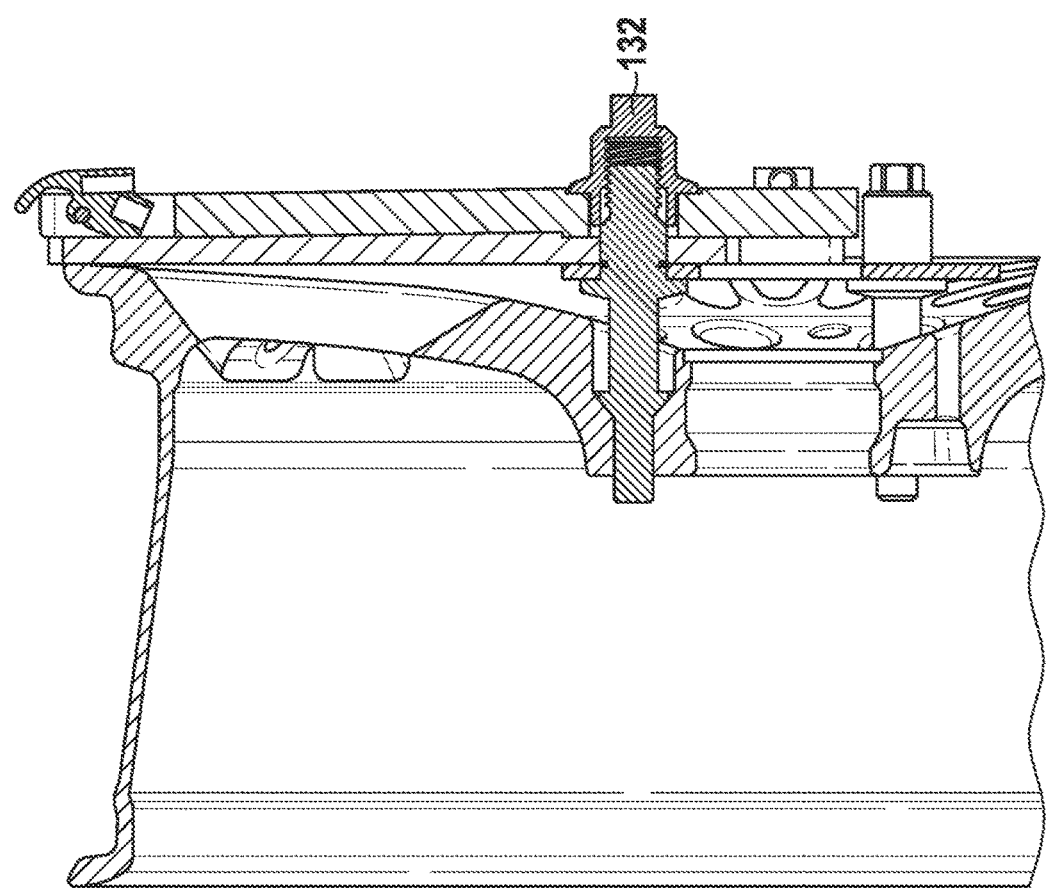

SELF-BRACING EMERGENCY WHEEL

CROSS-REFERENCE TO RELATED CASES

This is a national stage entry of International Patent Application No. PCT/EP2018/068293, filed Jul. 5, 2018, which claims the benefit and priority to German Patent Application No. 102017115184.2, filed Jul. 6, 2017, the disclosures of which are expressly incorporated herein by reference in their entireties.

BACKGROUND AND SUMMARY

The present invention relates to an attachment for a vehicle wheel which allows driving operation with limited tire function according to the preamble of claim 1.

A vehicle wheel means a vehicle wheel of a motor vehicle. Driving operation with limited tire function in the present case means driving operation in which the tire cannot be operated with the properties that it exhibits under usual road conditions and the usual tire condition. This can mean, for example, driving with a flat tire or also operation of the vehicle in icy or snowy conditions. The preferred field of application of the present invention is to enable driving with a flat tire.

In the present case, axial direction means the direction of the axis of rotation of the vehicle wheel. The radial direction means the direction orthogonal to the axis of rotation of the vehicle wheel. The tire of the vehicle wheel is thus arranged radially outwards when seen from the rim of the vehicle wheel. The bolt circle with the center opening of the wheel hub, or of the vehicle wheel, for example, is located radially inwards, the bolt circle of the vehicle wheel meaning in the present case the arrangement of the screw openings for introduction of the fastening screws into the wheel hub including the center opening. The peripheral direction means the direction along the periphery of the vehicle wheel, that is to say along its tread surface.

The object of the present invention is to provide an attachment for a vehicle wheel which can be mounted simply and securely, in particular the attachment is to prevent incorrect mounting.

This object is achieved by an attachment according to claim one. The attachment according to the invention is an attachment for a vehicle wheel which allows driving operation with limited tire function, having a base body, having a tread surface for contacting a road surface, and having at least one bracing means which is configured to engage with a hook portion behind a portion, in particular a rim flange, of a rim of the vehicle wheel, wherein the attachment comprises a bracing mechanism having a contact portion which is configured to actuate the bracing means and to bring the hook portion into engagement behind the portion of the rim, preferably the rim flange, when the contact portion is actuated, in particular subjected to pressure.

By means of the bracing mechanism having the contact portion, the bracing means can always be guided securely and in a reproducible manner into engagement behind the portion of the rim, or the rim flange. Engagement of the bracing means takes place virtually automatically and thus always reproducibly. The attachment according to the invention is for that purpose first attached to the vehicle wheel. This attachment can take place, for example, via a tension belt or alternatively also via a separate attachment device, which will be discussed in detail hereinbelow. Attached is here to be understood as meaning a state of the attachment in which, although the attachment is fixed to the vehicle wheel, the attachment is not yet fastened in such a manner that driving operation is safely possible also at high speeds. This final fastening which is safe for driving operation takes place by the engagement of the bracing means behind the portion of the rim, or the rim flange. Engagement behind the portion of the rim, or the rim flange, takes place virtually automatically. For example, the contact portion can be so configured and arranged that engagement occurs on the first rotation of the vehicle wheel. For this purpose, the contact portion is, for example, so configured that it projects beyond the tread surface of the attachment so that, when the vehicle wheel contacts the road surface with the contact portion on its first revolution, the contact portion is pressed into the attachment as a result of contact with the road surface and this force is transmitted to the bracing means, whereby the bracing means is actuated and thereby moved towards the rim, in particular the rim flange. As the bracing means moves towards the rim, or the rim flange, the hook portion is brought into engagement behind the portion of the rim, or the rim flange. The contact portion can also be arranged on the side of the attachment that faces the rim. If the attachment is then braced against the rim, for example via the tension belt or the attachment device, the contact portion is actuated and thus the bracing means is actuated, so that it comes into engagement behind the rim, in particular the rim flange.

Optionally, the bracing mechanism can be configured to contact the road surface with the contact portion when the attachment is attached to the vehicle wheel and the vehicle wheel is rotating, and thereby to actuate the contact portion, in particular subject it to pressure, preferably wherein the contact portion is arranged spatially, in particular when seen in the axial direction, in the tread surface of the attachment, and preferably wherein the contact portion in a deployed state extends in the peripheral direction flush with the tread surface of the attachment. By means of a simple first revolution of the vehicle wheel, or of the attachment, the bracing means in this embodiment come into engagement behind the rim. Advantageously, the contact portion is so configured and arranged that, when it is in its already actuated position, or inserted position, it extends flush with the tread surface located around it. Preferably, the attachment comprises a stop which is configured to prevent the contact portion from being movable radially inwards further than into a position in which it is flush with the tread surface.

Optionally, the bracing mechanism can be configured to contact the rim with the contact portion when the attachment is attached to the vehicle wheel and thereby to actuate the contact portion, in particular subject it to pressure, preferably wherein the contact portion is arranged on the side of the attachment that faces the rim. As a result, the attachment can be attached to rim using the tension belt, for example, and, when the tension belt is tightened, the contact portions are automatically actuated and the bracing means, as a result of being actuated by the contact portion, come into engagement behind the rim. The attachment can also be so designed that it is attached loosely to the vehicle wheel, for example via the attachment device, and can then be pressed manually against the vehicle wheel in such a manner that the contact portions contact the rim, or the vehicle wheel, and are thereby actuated and the bracing means then come into engagement behind the rim.

The bracing mechanism can be designed in different ways. The bracing mechanism can comprise a mechanical coupling, for example in the form of a force transmission element, between the contact portion and the bracing means. The bracing mechanism can, however, also be so configured that, when the contact portion contacts the road surface, the bracing means is or are actuated or moved pneumatically. For such an embodiment, the attachment preferably comprises a pressure medium reservoir via which pressure medium can be applied to the bracing means. It is also conceivable that the bracing means are moved electrically or electromechanically when the contact portion contacts the road surface. A magnetic movement of the bracing means is also possible. It is preferred if the bracing means are actuated or moved mechanically when the contact portion contacts the road surface, in particular if the bracing mechanism is so configured that the movement of the contact portion radially inwards on contacting the road surface is transmitted in a mechanically coupled manner to the bracing means.

It is preferred if the bracing mechanism is so integrated in the attachment that it remains on the attachment when the attachment is fastened to the vehicle wheel. Alternatively, the bracing mechanism can also be configured to be removable. For this purpose, the bracing mechanism can be arranged in a removable housing.

Preferably, the contact portion is integrated into the tread surface of the attachment, that is to say arranged spatially in the tread surface of the attachment. In particular, it is preferred if it is arranged, when seen in the axial direction, within the tread surface, that is to say if it is arranged within the axial extent of the tread surface. The contact portion can thus be so arranged and configured that it is virtually completely lowered and integrated in the tread surface after the first revolution of the attachment.

It is also preferred if the bracing mechanism comprises a ratchet device, wherein the ratchet device is configured to permit a free movement, in particular radially inwards or axially away from the rim, of the contact portion when the hook portion is in engagement behind the portion of the rim, in particular the rim flange. A free movement of the contact portion thereby means a movement of the contact portion independently of the movement of the bracing means. It is thus possible to limit the movement of the bracing means, or of the hook portion, in such a manner that the hook portion securely contacts and engages behind the portion of the rim and the contact portion is then movable radially inwards independently of the bracing means. It is thus ensured that the attachment is always fastened securely to the rim and the contact portion can nevertheless always be moved completely into the tread surface. The contact portion is thus movable independently of the bracing means. It is thus reliably ensured that the bracing means, when it is in engagement behind the rim flange, is not pressed against the rim flange in such a manner that the rim flange is damaged. In this embodiment, with the contact portion arranged in the tread surface, when the vehicle wheel moves off and the contact portion comes into contact with the road surface, the bracing means is thus moved towards the rim or the rim flange only until the bracing means is securely in engagement with the rim, or its hook portion is in engagement behind the rim, or the rim flange. The bracing means resting, for example, against the rim flange then offers sufficient resistance to further movement that the ratchet device is activated and the contact portion is able to move without the bracing means moving further towards the rim. Such a ratchet device can be provided, for example, by a resilient element which, above a specific counterforce, for example, bends elastically and/or is arranged in a compressed and force-transmitting manner between the bracing means and the contact portion. Also conceivable is a resilient element which, instead of being elastic, is plastically bendable and/or compressible. Likewise conceivable is an embodiment of the ratchet device in which it comprises a pressure cylinder which is arranged in a force-transmitting manner between the bracing means and the contact portion and is retracted above a threshold pressure, that is to say reduces in length instead of moving the bracing means further towards the rim. It is also conceivable to design the ratchet device by suspending or spring-mounting the bracing means, for example relative to a pressure transmission element, this suspension or spring mounting can thereby be in such a form that the bracing means is movable via the pressure transmission element until a limit force of the suspension is exceeded and the pressure transmission element compresses the suspension, or a spring associated therewith, instead of moving the bracing means.

It is also within the meaning of the invention if the bracing mechanism is so configured that the bracing means is biased, in particular spring-biased, towards the portion of the rim and is held by a retaining element which releases the bracing means when the contact portion contacts the road surface, so that the bracing means, as a result of the biasing, moves towards the rim, in particular the portion of the rim, in particular the hook portion engages behind the portion of the rim. Biasing of the bracing means ensures that the bracing means is always able to contact the rim, or the portion of the rim, with a predefined force, so that precisely defined engagement behind the portion of the rim, or the rim flange, is ensured.

It is also within the meaning of the invention if the bracing means is coupled with the bracing mechanism via a pressure limiting device which is configured to limit a pressure with which the bracing means is urged towards the rim and/or with which the bracing means contacts the rim to a limit pressure. For example, such a pressure limiting device can be in the form of a spring which, when the limit pressure is exceeded, prevents a further movement of the bracing means, so that damage to the rim of the attachment as a result of the bracing means pressing undesirably hard can reliably be prevented.

Optionally, it is also possible that the contact portion in a deployed state extends flush with the tread surface of the attachment. A deployed state means the state before the contact portion has come into contact with the road surface and the bracing means has moved in the direction towards the rim. In this embodiment, the contact portion can form, for example, an elevation, or a kind of bulge, on the tread surface of the attachment. For example, this can be achieved in that a tread body, which forms the tread surface, is raised locally by a flexible spring steel sheet, so that a flush or continuous profile of the tread body, or the tread surface, is obtained. If the contact portion, which in this embodiment comprises the raised portion of the tread body, moves off on the road surface, then it is urged radially inwards.

Optionally, it is also possible that the bracing mechanism comprises a holding mechanism which is configured to hold the bracing means in its position when the bracing means is in engagement with its hook portion behind the portion of the rim, or behind the rim flange. It is thereby preferred if the holding mechanism can be released from its holding state only by means of a tool. It is thus always ensured that the bracing means remains in its engaged position behind the rim, or the rim flange.

It is also preferred if the bracing means has a maximum travel, which is more than one inch. The maximum travel means the maximum distance which the bracing means can cover in the radial direction. The attachment can thus be used for different rim sizes, for example 17 inch and 19 inch rims. Advantageously, the movement initiated via the contact portion can cover the entire maximum travel of the bracing means.

It is also advantageous if the bracing mechanism comprises a translation device which is configured to translate a movement of the contact portion into a different movement in terms of distance, preferably a larger movement, of the bracing means. This makes it possible for a small movement of the contact portion to make possible a sufficiently large movement of the bracing means. The contact portion can thus be configured, as it were, as a "small elevation" on the tread surface of the attachment and nevertheless be sufficient to actuate the bracing means over large distances.

It is also within the meaning of the invention if the bracing means can flexibly be positioned in at least two offset, preferably radially offset, size positions, wherein the bracing means can be actuated or moved via the contact portion in each of the offset size positions. To that end, the bracing means can thus be actuated or moved via the contact portion into different positions, the size positions, which are tailored to the size of the rim.

Preferably, a movement of the bracing means on engagement behind the rim is a translational radially inwardly directed movement or a radially inwardly directed pivoting movement.

It is also within the meaning of the invention if the attachment comprises a first peripheral segment, preferably having a peripheral extent of more than 180°, in particular of more than 190°, and a second peripheral segment, wherein the second peripheral segment is detachably or pivotably or displaceably connected to the first peripheral segment. The attachment can thus be attached particularly easily to the vehicle wheel. For example, if the two segments are pivotable relative to one another, then the second peripheral segment can initially remain pivoted on the first peripheral segment during mounting, when the first peripheral segment is attached to the vehicle wheel, thus the contact portions on the first peripheral segment can be actuated and its bracing means can engage behind the rim. For example, the vehicle wheel can be moved so that the first peripheral segment comes into contact with its tread surface with the road surface and the contact portions optionally arranged thereon are actuated. The second peripheral segment can then simply be pivoted upwards and locked in the intended position for operation preferably via a locking mechanism. The vehicle can then be moved further, wherein the vehicle wheel with the attachment fastened thereto rotates, whereby the contact portions on the second peripheral segment come into contact with the road surface and actuate respective bracing means, or move them towards the rim, and bring them into engagement behind the rim, or the portion of the rim, in particular the rim flange.

The peripheral extent of the first peripheral segment of more than 180° or more than 190° has the advantage that the first peripheral segment forms the major part of the attachment in the peripheral direction and can thus be attached stably and firmly to the vehicle wheel in a simple manner. In particular, the first peripheral segment can be arcuate and preferably comprise a strut extending in the manner of a chord. Particularly high stability and simple attachment of the attachment to the vehicle wheel is thereby obtained. Such an attachment having a first peripheral segment and a second peripheral segment can also comprise contact portions which are arranged facing the rim.

It is also within the meaning of the invention if the base body comprises a mounting portion, which is closed in the peripheral direction, and a tread portion, wherein the tread portion is configured in the peripheral direction with a gap and comprises an insert portion which can be received in the gap, which insert portion can be received in the gap in such a manner that the tread portion forms the tread surface. Preferably, the bracing means is or are arranged in the region of the mounting portion, while the tread portion comprises the tread surface.

Because the tread portion has the gap in the peripheral direction, it is possible to attach and/or fasten the mounting portion and the tread portion to the vehicle wheel without removing the vehicle wheel from the vehicle or lifting the vehicle using a car jack. For this purpose, the gap is simply oriented towards the ground and mounting is carried out.

When the mounting portion and the tread portion are attached or fastened to the vehicle wheel, the vehicle can be moved slightly. The gap then moves, as a result of the rotation of the vehicle wheel, away from its orientation towards the ground. For example, the vehicle can be moved forwards by half a turn of the vehicle wheel, the gap is then no longer oriented towards the ground but points upwards. The insert portion can then be inserted or received in the gap. The attachment then has a circular tread surface which is closed in the peripheral direction. Mounting of the attachment is then complete and the vehicle is ready to drive. Owing to the bracing mechanism and the associated bracing means, fastening of the attachment to the vehicle wheel is ensured virtually automatically.

It is advantageous if the insert portion is detachable from the tread portion and/or is pivotably or displaceably connected to the tread portion. The insert portion can thus be designed, for example, to be simply removable or can be capable of being releasably connected to the tread portion. The insert portion can be connected or capable of being connected to the tread portion via a releasable or non-releasable pivot joint. Or it can be configured or fastened to be displaceable (releasable or non-releasable) relative to the tread portion.

Advantageously, the gap extends at least over ⅛, preferably at least over ⅙, preferably at least over ¼, of the peripheral extent of the tread portion. It is thus ensured that there is sufficient free space to fasten the attachment to the vehicle wheel without having to remove the vehicle wheel or lift the vehicle using a car jack.

It is also preferred if the gap extends over not more than half, preferably over not more than ⅓, of the peripheral extent of the tread portion. As a result, by simply turning the wheel, the gap can be moved away from the ground so that the insert portion can be received in or inserted, folded or pushed into the tread portion in a simple manner.

It is also preferred if the tread portion is integrally formed with the mounting portion. The attachment as a whole is thus particularly robust and simple to handle.

It is also preferred if the tread portion is detachable from the mounting portion. The attachment is thus easily stowable and can be stored particularly compactly.

It is also preferred if the mounting portion can be dismantled or folded. Compact storage of the attachment, for example in the glove compartment of a vehicle, is thus possible.

It is also preferred if the mounting portion is rigid and cannot be dismantled. The attachment is thus particularly easy to handle and it has high stability.

It is also within the meaning of the present invention if the attachment comprises an attachment device which is configured to orient and attach the attachment on the vehicle wheel in such a manner that the attachment can subsequently be fastened to the vehicle wheel by a movement of the vehicle by means of the bracing means which can be actuated via the contact portion. For example, the above-mentioned strut extending in the manner of a chord can comprise screw openings with which it can be attached via a screw to the bolt circle of the vehicle wheel. Attachment at the center opening of the vehicle wheel is also conceivable. The attachment can also have locks which are configured to engage behind rim spokes of the rim. Such locks can be provided, for example, on the above-mentioned strut in order to permit simple attachment to the vehicle wheel.

It is generally also within the meaning of the invention if the attachment device is configured to attach the attachment in the region of the bolt circle of the vehicle wheel, preferably wherein the attachment device comprises an engagement element which is configured to engage in a form-fitting manner behind a portion, preferably a groove, of a center opening, and/or comprises a screw connection which is configured to fasten the attachment to the bolt circle, and/or comprises a device for engaging behind a spoke of the rim.

Optionally, the attachment device (54) comprises a device for gripping a conventional wheel bolt by clamping and/or engaging behind it, preferably wherein the device comprises a clamping cap having at least two clamping arms and comprises a clamping sleeve which, when it is pushed onto the clamping cap, biases the clamping arms towards one another in such a manner that a head of a wheel bolt can be gripped by the clamping arms, and comprises a bolt with which the clamping sleeve can be clamped against the clamping cap.

It is also preferred if the attachment comprises a plurality of bracing means which are preferably distributed in a peripheral direction, preferably wherein either the attachment comprises a plurality of contact portions which are each configured to actuate a bracing means, or one contact portion is configured to actuate a plurality of bracing means. Secure fastening around the entire periphery of the attachment is thereby ensured.

It is also preferred if the hook portion of the bracing means, when seen in the axial direction, slopes radially inwards, preferably in a linear or curved manner, wherein the bracing means is so configured that the hook portion moves, in particular is displaced, radially inwards when the bracing means is actuated via the contact portion and the bracing means moves towards the rim, in particular towards the rim flange, and that, by the movement of the hook portion, the attachment is urged in the axial direction towards the rim. It is thereby ensured, when the bracing means engage or engages behind the rim, not only that the bracing means is fixedly positioned relative to the rim in the radial direction, but also that the attachment as a whole is urged towards the vehicle wheel on actuation of the bracing means, so that it rests against the vehicle wheel, which increases the stability of the fastening.

Preferably, the bracing means has an elastically resilient surface in the region of the hook portion. Damage to the rim can thereby reliably be avoided.

Preferably, the attachment has an elastically resilient surface in the region which is provided for contacting the rim. Damage to the rim can thereby reliably be avoided.

Preferably, a tread body is arranged on the outer periphery of the attachment and held preferably in a form-fitting manner, in particular via form-fitting engagement. The tread body can thereby be fastened easily and securely to the attachment in a simple manner.

Preferably, the tread body is formed of an elastic rubber material or polymer material. The form-fitting holding, or the form-fitting engagement, of the tread body can be achieved by a dovetail-shaped channel, wherein the tread body has a corresponding portion which has a complementary shape to the channel and which can be received in the channel in a form-fitting manner.

It is also advantageous if the tread body is configured to be shock-absorbing, preferably wherein the tread body is formed of an elastically resilient material and/or has an elastically resilient structure, in particular has a structure comprising cavities and/or holes. The tread body is thereby advantageously able to cushion unevenness of the road surface. However, an air-filled tread body similar to a tire is also conceivable. A tread body of a polymer material with openings extending substantially in the axial direction, which result in an elastically damping property of the tread body, is conceivable. However, other structures of the tread body which result in the resilient properties are also conceivable, in particular cavities, which can be closed or open, in the tread body are conceivable in this connection.

It can be advantageous if the base body has openings. These openings can serve on the one hand to reduce the weight of the base body and thus of the attachment. On the other hand, these openings can serve to make the attachment easily foldable or collapsible. In the folded or collapsed state, preferably at least one element protruding from the surface of the base body can project into such an opening.

Optionally, the attachment comprises a tire displacement device which is configured to displace the tire away from the rim flange in the axial direction on attachment of the attachment and/or on actuation of the bracing means, preferably wherein a tire displacement device is associated with each of a plurality of bracing means. Secure engagement of the bracing means behind the rim flange is thereby easier to achieve, since the tire is lifted from the rim flange.

Optionally, the tire displacement device is formed separately from the bracing means. The tire displacement device can be, for example, a projection arranged next to the bracing means in the peripheral direction, whereby the bracing means remains free to move even when the tire displacement device is resting against the tire and pushing the tire away from the rim flange.

Optionally, the tire displacement device comprises a projection, preferably two projections, which protrudes in the axial direction from the side of the attachment that faces the rim and in particular is rod-shaped or curved. This represents a simple embodiment variant which securely displaces or lifts the tire away from the rim flange on bracing against the rim.

Optionally, the projection is so configured that, on or after engagement of the bracing means behind the portion of the rim, preferably the rim flange, it moves away from the tire. The projections can, for example, be so coupled with the bracing means that they are retracted as soon as the bracing means is in engagement behind the rim, or the rim flange, and the tire is released, so that the tire urges the bracing means against the rim flange. The bracing means is thereby additionally secured in its engagement.

Also within the meaning of the present invention is an attachment, according to one or more of the above-described embodiments, in which, instead of the bracing mechanism having the contact portion, an actuating device is provided for the bracing means, with which actuating device the bracing means can be brought into engagement behind the portion of the rim, preferably the rim flange. Preferably, the actuating device is in the form of a lever mechanism which can be, for example, manually operable.

It is also advantageous if the bracing means comprises or comprise an application device via which a lever can be applied to the bracing means, so that the bracing means is movable or pivotable via that lever onto the portion of the rim, preferably the rim flange. Such a lever can form the actuating device just mentioned.

Also within the meaning of the present invention is a system comprising a vehicle rim and an attachment, wherein the vehicle rim has a specially provided engagement position which is configured to receive the bracing means of the attachment in its engaged position.

Optionally, at least one of the bracing means has a sensor device which detects when the bracing means is in engagement in the desired manner behind the rim flange, or the rim. The sensor device can be coupled with a signaling device which delivers a signal via which the driver of the vehicle can identify that the attachment is fastened to the vehicle wheel in the intended position, that is to say the bracing means are in engagement in the desired manner behind the rim, or the rim flange. The signaling device can be arranged, for example, in the passenger compartment. The signaling device can, however, also be arranged on the attachment itself. The corresponding signal can be delivered, for example, visually, acoustically or haptically.

The attachment can also comprise a device which detects when the vehicle wheel has performed a complete revolution so that all the contact portions arranged in the tread surface have, or should have, contacted road surface. It can then be indicated to the driver of the vehicle whether the bracing means have engaged properly behind the rim.

Advantageously, the attachment according to the invention is combined with a vehicle having a tire pressure sensor.

A typical sequence can be, for example, as follows: A damaged tire is detected by a tire pressure sensor via the low pressure.

Once the vehicle has stopped and an attachment, or the first peripheral segment or the mounting portion, has subsequently been attached, the starting position of the vehicle wheel in question is recorded.

On moving, for positioning of the second peripheral segment, half a revolution of the wheel is determined, preferably via the rotational speed sensor, and communicated to the driver of the vehicle by a preferably visual and/or acoustic signal. The contact portions of the first peripheral segment have then contacted the road surface F and the bracing means are in engagement behind the rim flange.

Mounting of the attachment can then be completed by bringing the second peripheral segment into its final position and moving the vehicle further so that its contact portions also come into contact with the road surface.

Correct engagement of the bracing means is detected via sensor devices, and a corresponding signal is delivered to the driver of the vehicle.

The portion of the rim behind which the bracing means engage on fastening can be formed in or between the spokes of the rim.

Part of the present invention is also a system comprising an attachment according to one or more of the embodiments described in this application and two rims, wherein the rims have different sizes, wherein there is provided on each of the rims a portion which is configured to be engaged by the bracing means of the attachment, wherein in both rims the portions of the rims have the same distance with respect to the respective axes of rotation of the rims. An attachment having a fixed position of the bracing means can thereby be used for different rims, for example for winter and for summer tires.

BRIEF DESCRIPTION OF THE DRAWINGS

Further features, possible applications and advantages of the invention will become apparent from the following description of exemplary embodiments of the invention which are explained with reference to the drawing, wherein the features can be fundamental to the invention both on their own and in different combinations, without explicit reference again being made thereto. In the drawing:

FIG. 7 includes FIGS. 7A-7C, and shows further embodiments in a schematic representation;

FIG. 9 shows an alternative form of the bracing means and of the bracing mechanism;

FIG. 14 shows a further embodiment of an attachment according to the invention;

FIG. 15 shows a detail of the attachment of FIG. 14 in a sectional representation;

FIG. 18 includes FIGS. 18A-18D, and shows a further embodiment of an attachment according to the invention;

FIG. 22 includes FIGS. 22A and 22B, and shows a device for gripping a wheel bolt by engaging behind it;

FIG. 23 includes FIGS. 23A and 23B, and shows a further device for gripping a wheel bolt by engaging behind it;

FIG. 24 shows a bracing mechanism with bracing means;

FIG. 25 includes FIGS. 25A-25C, and shows a further embodiment of an attachment according to the invention having variably positionable bracing means;

FIG. 26 includes FIGS. 26A and 26B, and shows a further embodiment of an attachment according to the invention which is attached to the vehicle wheel by means of special screws;

DETAILED DESCRIPTION

In the following figures, corresponding components and elements bear the same reference signs. For the sake of better clarity, not all reference signs are reproduced in all the figures.

Figure 1:
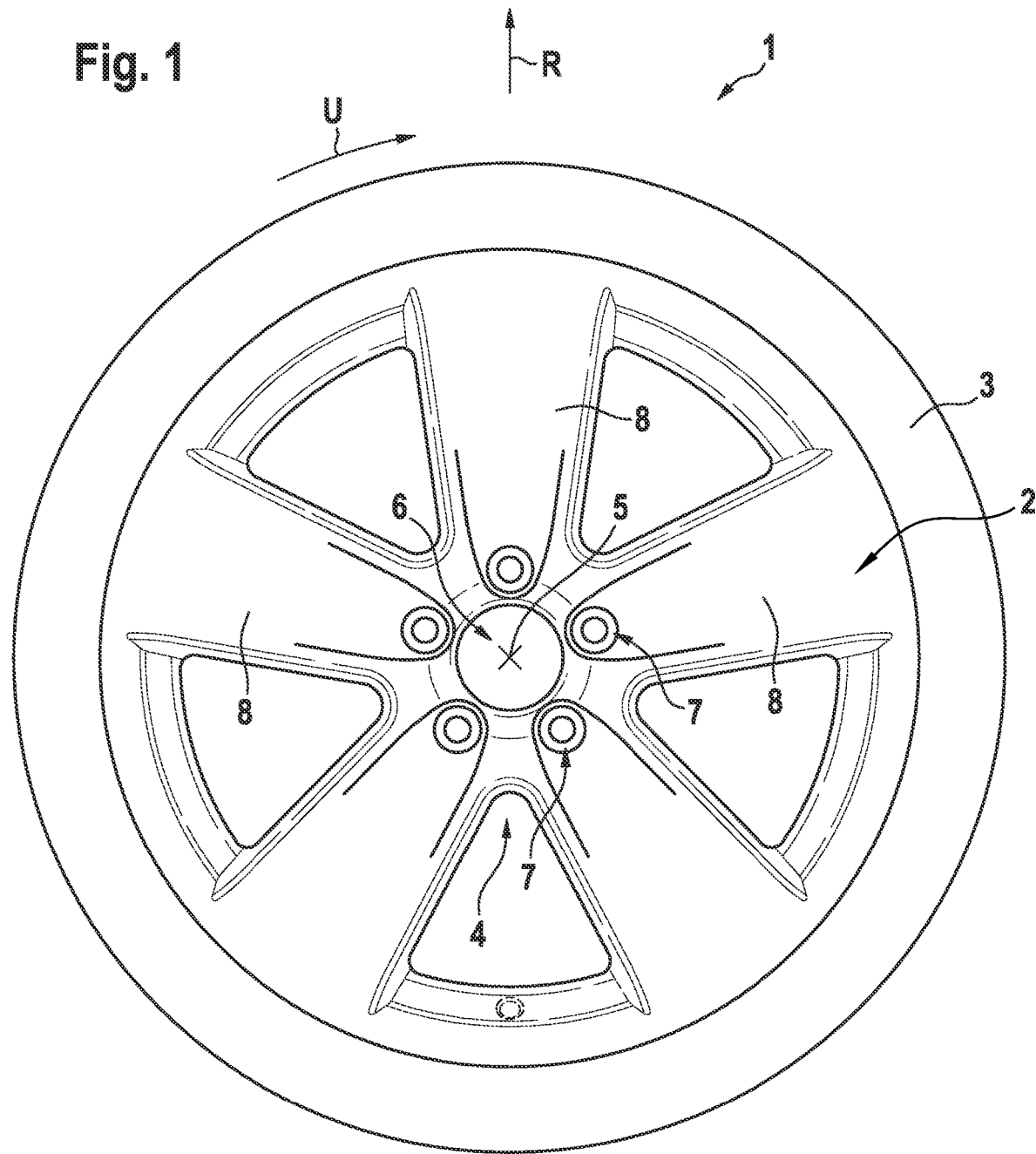
FIG. 1 shows a vehicle wheel, looking in an axial direction.
Figure 2:
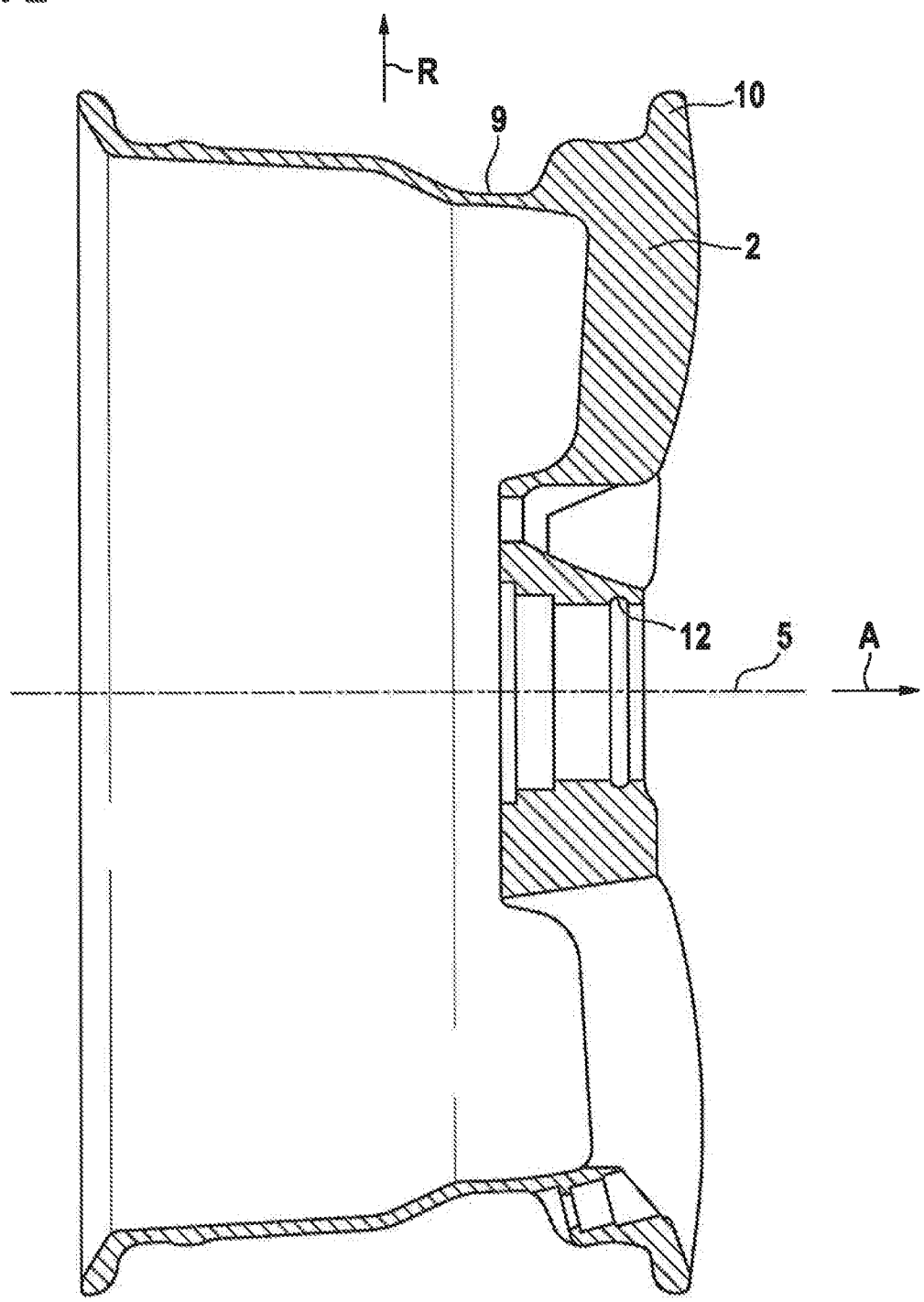
FIG. 2 is a sectional representation of the rim of the vehicle wheel of FIG. 1.

FIG. 1 shows, in a schematic representation, a vehicle wheel 1. The vehicle wheel 1 comprises a rim 2 and a tire 3 attached to the rim 2. The rim 2 is shown on its own in FIG. 2 without the tire 3. A peripheral direction is represented by an arrow having the reference sign U. An axial direction is represented by an arrow having the reference sign A (FIG. 2). A radial direction is represented by an arrow having the reference sign R. Radially on the inside, the rim 2 comprises a bolt circle 4 of the vehicle wheel 1. In the center of the bolt circle 4 there is arranged a so-called center opening 6, about an axis of rotation 5 of the vehicle wheel 1 extending in the axial direction A, which is sometimes also referred to as a hub borehole or center hole centering. In the present case, the bolt circle 4 comprises five screw holes 7, two of which are provided with a reference numeral. In the present vehicle wheel 1, five spokes 8 extend radially outwards from the region of the bolt circle 4.

The rim 2 comprises a rim well 9 and a rim flange 10, and the center opening 6 has a recessed peripheral groove 12.

If the tire 3 of the vehicle wheel 1 has a hole, the air in the tire escapes and the tire function of the vehicle wheel 1 is limited. In order to continue to allow driving operation in such a case, an attachment 14 according to the invention can be used.

Figure 3:
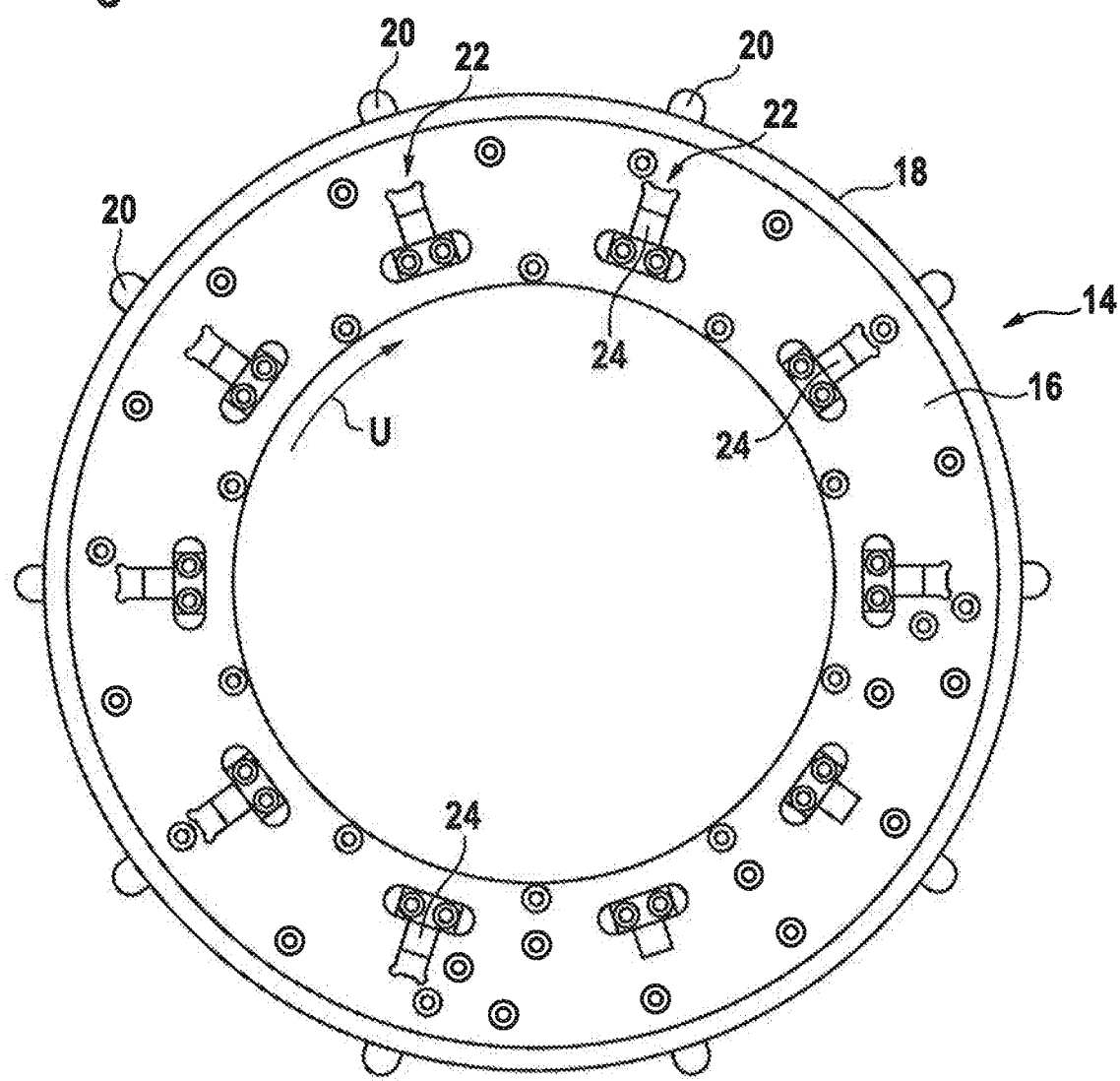
FIG. 3 shows a first embodiment of an attachment according to the invention.

An example of such an attachment is shown in FIG. 3. The attachment 14 is configured with a base body 16 and with a tread surface 18 for contacting a road surface F.

In FIG. 3, the attachment 14 is shown looking at its side that is remote from the vehicle wheel 1 in the mounted state. A plurality of contact portions 20 are arranged on the attachment 14 distributed around the periphery of the attachment 14, or of the tread surface 18. The contact portions 20 are part of a bracing mechanism 22, which is configured to contact the road surface F with the contact portions 20 when the attachment 14 is attached to the vehicle wheel 1 and the vehicle wheel 1 is rotating.

The attachment 14 also comprises a plurality of bracing means 24 with respective hook portions 26 which are not visible in FIG. 3, each of which has an associated bracing mechanism 22 with a contact portion 20.

When the vehicle wheel 1 with the attachment 14 attached thereto moves off, the contact portions 20 are actuated by contact with the road surface F. In the present case, via contact of the contact portions 20 with the road surface F via the respective bracing mechanism 22, a force is exerted on the respective bracing means 24. In the present case, the respective bracing means 24 are actuated by this force and thereby moved towards the rim 2, in particular the rim flange 10, in particular the hook portion is brought into engagement behind the rim flange 10, which represents a portion 11 of the wheel 1. However, the bracing means 24 can also engage behind portions 11 of the wheel 1 other than the rim flange 10 of the rim 2. Actuation of the bracing means 24 can, however, also take place without a force being transmitted from the contact portion 20 to the bracing means.

On mounting of the attachment 14, the attachment is first attached to the vehicle wheel 1. This can be carried out, for example, by means of a conventional tension belt. It is preferred if the attachment 14 comprises an attachment device 54, which will be discussed in greater detail hereinbelow. In the case of this attachment of the attachment 14, the attachment is not yet fastened to the vehicle wheel 1 in such a manner that vehicle operation is reliably ensured.

When the attachment 14 has been attached to the vehicle wheel as described above, the vehicle wheel 1 is moved by one revolution and the individual contact portions 20 contact the road surface F.

During this first rotation, the respective bracing mechanism 22 of each bracing means 24 is actuated. The bracing mechanisms 22 are configured to contact the road surface F with the contact portions 20 when the attachment 14 is attached to the vehicle wheel 1 and the vehicle wheel 1 is rotating, whereby it is actuated, in particular subjected to pressure, and, through contact with the road surface F, to actuate the bracing means 24. In the present case, the contact portions 20 are so coupled with the bracing means 24 that the contact portions 20 exert a force on the bracing means 24 in order to actuate the bracing means 24 and move them towards the rim 2, in particular the rim flange 10. As a result of this movement of the bracing means 24, their respective hook portion 26 is brought into engagement behind the rim flange 10. When the vehicle wheel 1 has completed a first revolution, all the contact portions 20 have been in contact with the road surface F and all the bracing means 24 have been actuated via the respective contact portion 20. After actuation, the bracing means 24 are in engagement behind the rim flange 10. The attachment 14 is then securely fastened to the vehicle wheel 1 and driving operation of the vehicle can be resumed.

Figure 4:
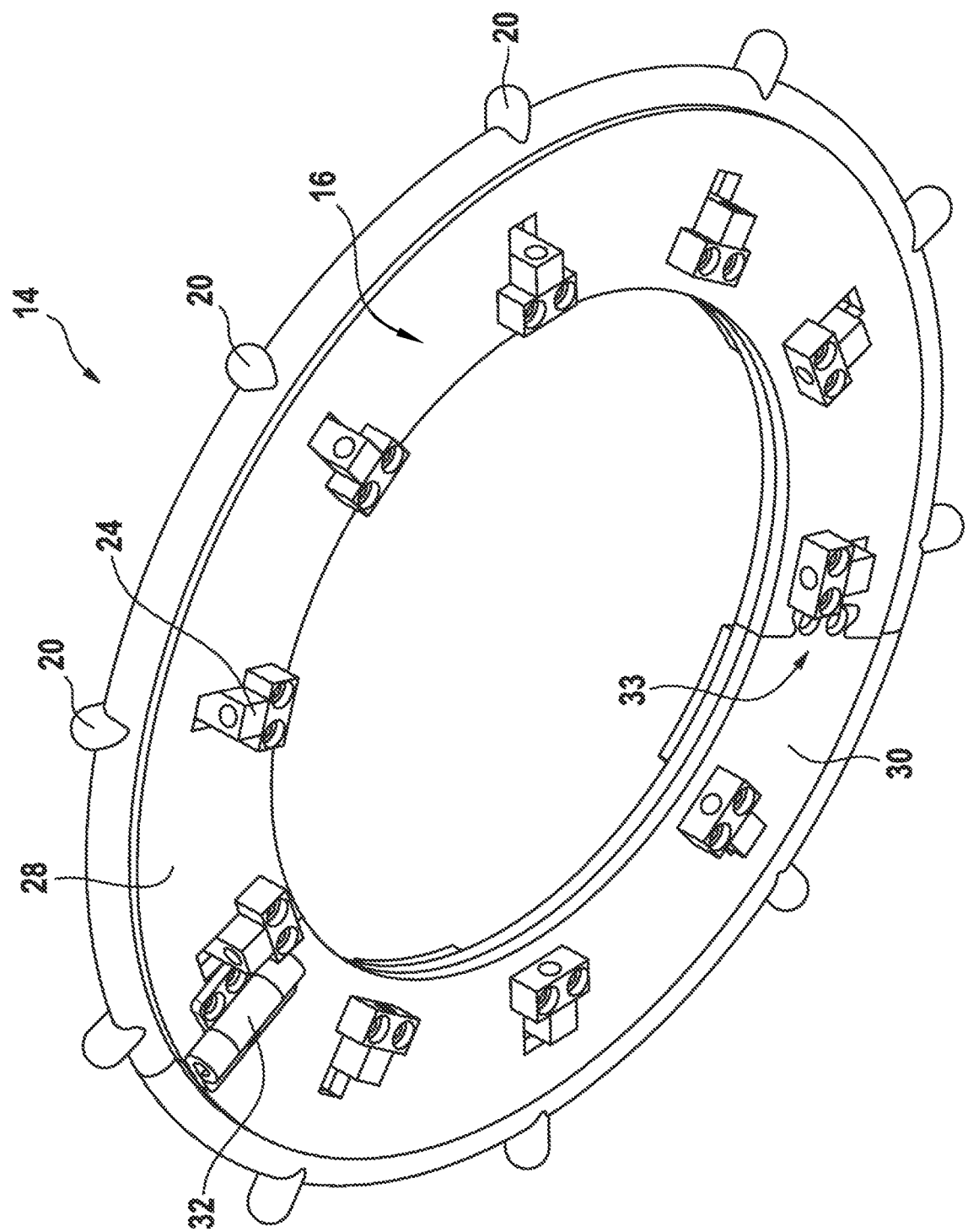
FIG. 4 shows a further embodiment of an attachment according to the invention.
Figure 5:
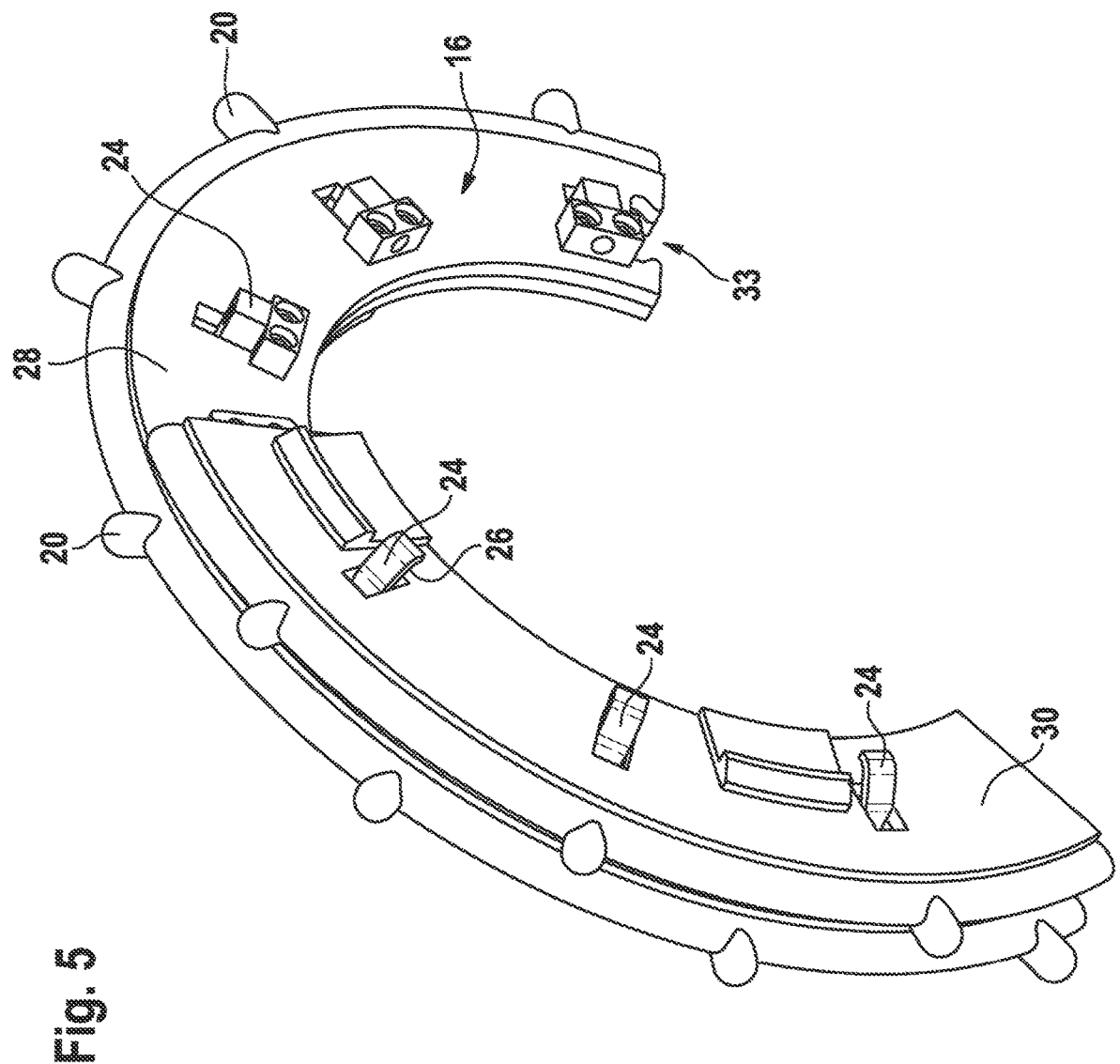
FIG. 5 shows the embodiment of FIG. 4 in the folded state.

An alternative embodiment of the attachment 14 is illustrated in FIGS. 4 and 5. The attachment 14 shown in FIGS. 4 and 5 comprises a two-part base body 16. The base body 16 comprises a first peripheral segment 28 and a second peripheral segment 30. The first peripheral segment 28 has a peripheral extent of more than 180°. The two peripheral segments are connected together via a hinge device 32 and on the side opposite the hinge device 32 the two peripheral segments are connected via a dovetail- like engagement portion 33.

In FIG. 4, the attachment 14 is shown in a configuration in which it is attached to the vehicle wheel 1.

In FIG. 5, the attachment 14 is shown in a configuration in which it is easily stowable and can be brought into the configuration shown in FIG. 4 by simply being folded out. The attachment 14 can be attached in folded form to the vehicle wheel 1, wherein the region with the peripheral gap is oriented towards the road surface F. The vehicle wheel 1 can then be moved so that the region of the attachment with the peripheral gap is oriented away from the road surface F. The second peripheral segment 30 can be folded into the region with the peripheral gap and the vehicle wheel can be moved, whereby the contact portions 20 and thereby in turn the bracing means 24 are actuated.

Figure 6:
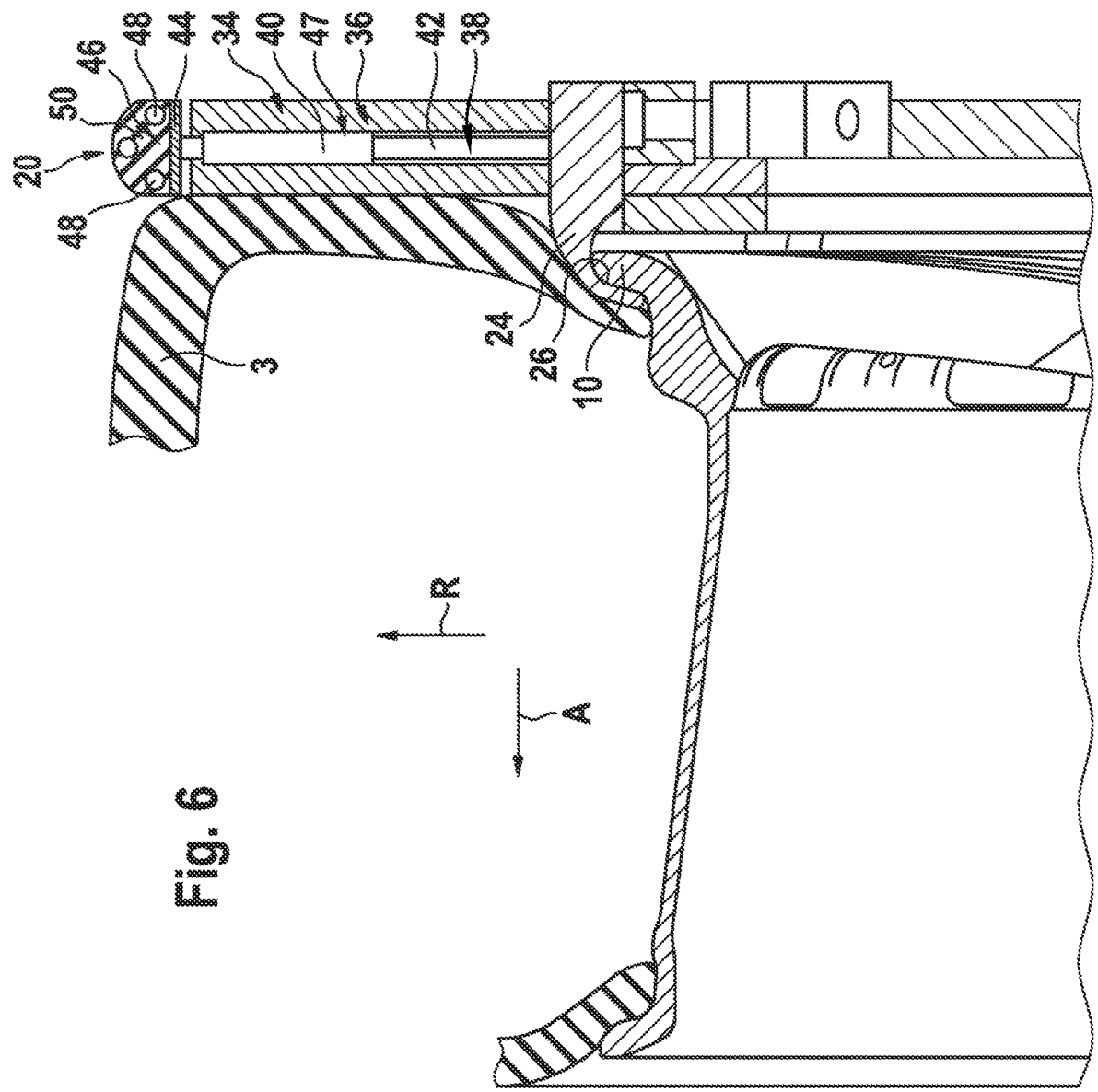
FIG. 6 shows part of a further embodiment in a sectional representation.

FIG. 6 illustrates the engagement of the bracing means 24 behind the rim flange 10, by means of a further embodiment according to the invention. The embodiment of FIG. 6 comprises a pressure transmission device 34 having a ratchet device 36. The ratchet device 36 comprises a pressure cylinder 38 having a first cylinder part 40 and a second cylinder part 42. The bracing means 24 is mechanically coupled with the contact portion 20 via the ratchet device 36. In the present case, this means that, by a movement of the contact portion 20, a force can be transmitted to the bracing means 24 via the ratchet device 36. When the vehicle wheel 1 with the attachment 14 attached thereto moves off, the contact portions 20 are moved radially inwards as a result of contact with the road. The bracing means 24 are thereby actuated or, in the present case, a force is transmitted to the bracing means 24. The bracing means 24 are pressed with that force against the rim 2, or the rim flange 10. When actuated, the bracing means 24 engage behind the rim flange 10. When all the bracing means 24 are engaged behind the rim flange 10, the attachment 14 is fastened to the vehicle wheel. If, during the above-mentioned force transmission, a specific force, or a limit pressure, with which the bracing means 24 presses against the rim flange 10 is exceeded, the two cylinder parts 40 and 42 slide into one another. This happens, for example, if the contact portion 20 has not yet reached its end position but the hook portion 26 is already fully engaged behind the rim flange 10 and is resting against it. In the present embodiment, the contact portion 20 is in the form of a spring sheet 44 which is curved in the peripheral direction U, which spring sheet urges a portion of a tread body 46 radially outwards. In the unloaded state, this portion of the tread body 46 thus differs from the annular shape of the remainder of the tread body 46 and is pressed inwards when the vehicle moves over the road surface F, wherein force is transmitted via the pressure transmission device 34 and the ratchet device 36 to the bracing means 24.

In the present case, the tread body 46 comprises cavities 48 which are arranged in an elastic material 50. The tread body 46 is thus particularly resilient and damping.

The pressure transmission device 34 having the ratchet device 36 also comprises a holding mechanism 47. In the present exemplary embodiment, the holding mechanism 47 is so configured that it locks the two cylinder parts 40 and 42 together when the contact portion 20 has moved completely into the tread surface 18. Other forms of the holding mechanism 47 are conceivable. The holding mechanism 47 prevents the bracing means 24 from moving out of engagement behind the portion 11 of the wheel 1, or the rim flange 10, when the contact portion 20 is no longer resting on the road surface F. Preferably, the holding mechanism 47 can be released from its latched state by a tool FIG. 7A shows a further embodiment of an attachment 14. The attachment 14 shown in FIG. 7A comprises an attachment device 54 which is configured to orient the attachment 14 on the vehicle wheel 1 and attach it thereto in such a manner that the attachment 14 can subsequently be fastened to the vehicle wheel 1 by a movement of the vehicle by means of the bracing means 24 which can be actuated via the contact portion 20.

The attachment device 54 is in the present case arranged on a strut 56 which extends in the manner of a chord. The attachment device 54 comprises a hole pattern 58 corresponding to the hole pattern of the bolt circle 4. The attachment 14 can thereby be attached by removing, for example, two bolts of the vehicle wheel 1. The bolts are removed and the attachment 14 is screwed to the vehicle wheel 1 via the bolt circle 4 using two longer screws. Attachment via a device for engagement into the center opening 6, in particular into the groove 12 of the center opening 6, is also conceivable here. Alternatively to the removal of the bolts of the vehicle wheel 1, the attachment device can also comprise a device for gripping a conventional wheel bolt by clamping and/or engaging behind it, which will be discussed in greater detail hereinbelow.

For example, first the first peripheral segment 28 can be attached. The vehicle wheel 1 can then be rotated through 180° so that the first peripheral segment 28 comes into contact with the road surface F. The second peripheral segment 30 can then be folded upwards and its hinge devices 32 can be locked. The vehicle wheel 1 can then perform a complete revolution and all the contact portions 20 contact the road surface F, whereby all the bracing means 24 are brought into engagement behind the rim flange 10. The attachment 14 is then fastened to the vehicle wheel 1 ready for driving.

It is preferred if the contact portion 20 in a deployed state extends flush with the tread surface 18 of the attachment 14. Such an embodiment is shown in FIG. 7[[b)]]B. Flush means that the contact portion does not form a sudden step relative to the tread surface 18.

The function of the ratchet device 36 is again shown schematically in FIG. 7C. In the first image of FIG. 7C, the contact portion 20 is fully deployed. On contact with the road surface F, the contact portion 20 is first retracted, as a result of the pressure of the weight of the vehicle, until the bracing means 24 is in contact with the rim 2, or the hook portion 26 engages behind the rim flange 10. This state is shown in FIG. 7C in the second image. The ratchet device 36 is then actuated. And the contact portion 20 moves further radially inwards, independently of the movement of the bracing means 24, until it has moved completely into the tread surface 18 of the attachment. The ratchet device 36 also at the same time forms a pressure limiting device 52, since it limits the pressure with which the bracing means 24 contacts the rim 2, or the rim flange 10, to a limit pressure.

The bracing means 24 preferably have a maximum travel, which is more than one inch. An attachment 14 can thus be adapted to different rim sizes while the vehicle wheel size remains the same. This adaptation takes place automatically by actuation of the bracing means 24 via the contact portions 20. This is illustrated by way of example and schematically in FIG. 8. FIG. 8A shows, schematically, the attachment of an attachment to a smaller rim 2. The middle representation of FIG. 8A corresponds to the attachment of the attachment to the vehicle wheel 1 before the bracing means 24 engages behind the rim flange 10. The contact portions 20 project beyond the tread surface 18. If the vehicle wheel 1 is rotated, the contact portions 20 move radially inwards and the bracing means 24 engage behind the rim flange 10. This state is shown in the right-hand representation of FIG. 8A. This configuration corresponds to the fastened state of the attachment 14, in which the attachment 14 is mounted on the vehicle wheel 1 ready for driving.

Figure 8C:
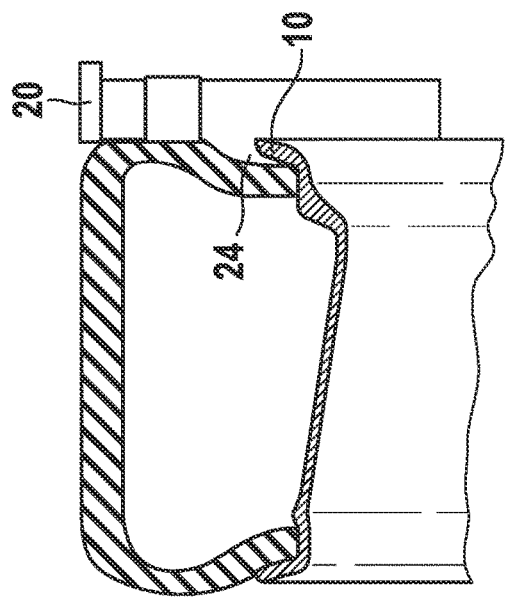
FIG. 8 includes FIGS. 8A-8E, and is a schematic diagram of the actuation of a bracing means.
Figure 8B:
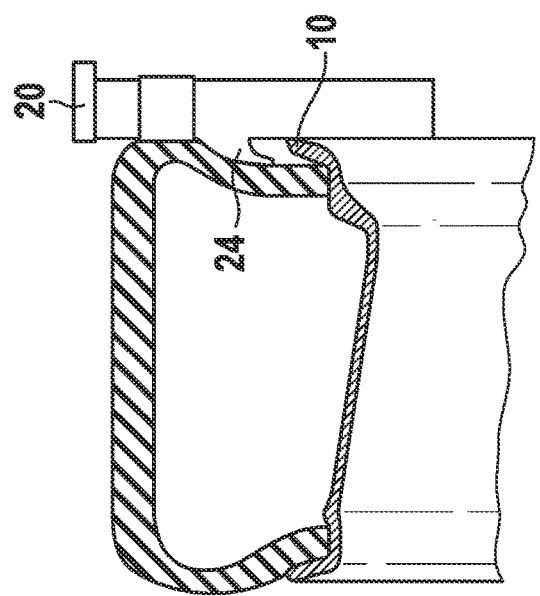
Figure 8A:
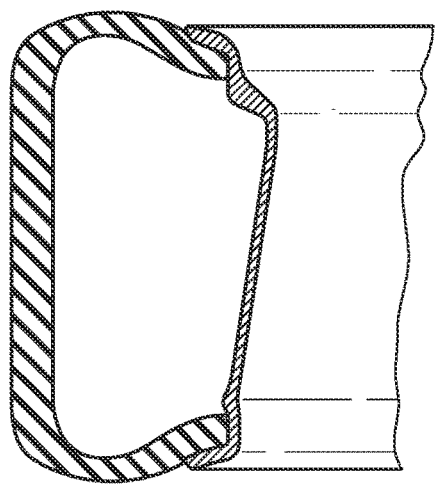
Figure 8E:
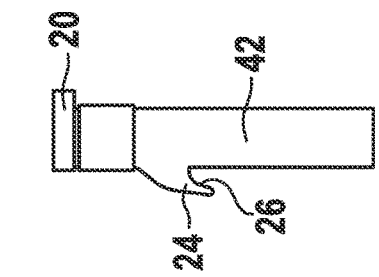
Figure 8D:
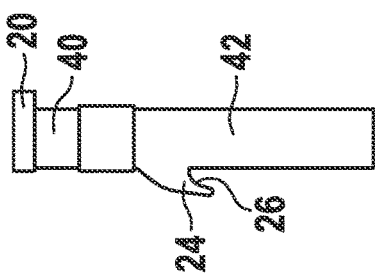

The configuration of the contact portion 20 relative to the bracing means 24 shown in the right-hand representation of FIG. 8A is shown again in the left-hand representation of FIG. 8B. If the corresponding attachment 14 is fastened to a larger rim 2, with the same diameter of the vehicle wheel 1, the contact portion 20 is transferred into the configuration shown in the right-hand representation of FIG. 8B.

Further possible forms of the bracing mechanism 22 are shown in FIGS. 9 to 12. FIG. 9 shows an embodiment in which the bracing means 24 is connected to the contact portion 20 via a shaft 56, which forms a force transmission element 56. Arranged on the shaft 56 are angled projections 58, into which a spring-mounted latching mechanism 60 can engage. The latching mechanism 60 together with the projections 58 forms a holding mechanism 47 which holds the hook portion 26 in contact with the rim flange 10 when it rests against it. The holding mechanism 47 is shown only schematically in FIG. 9, for example the spacing of the individual angled projections 58 can be substantially finer than is shown in FIG. 9.

Figure 10:
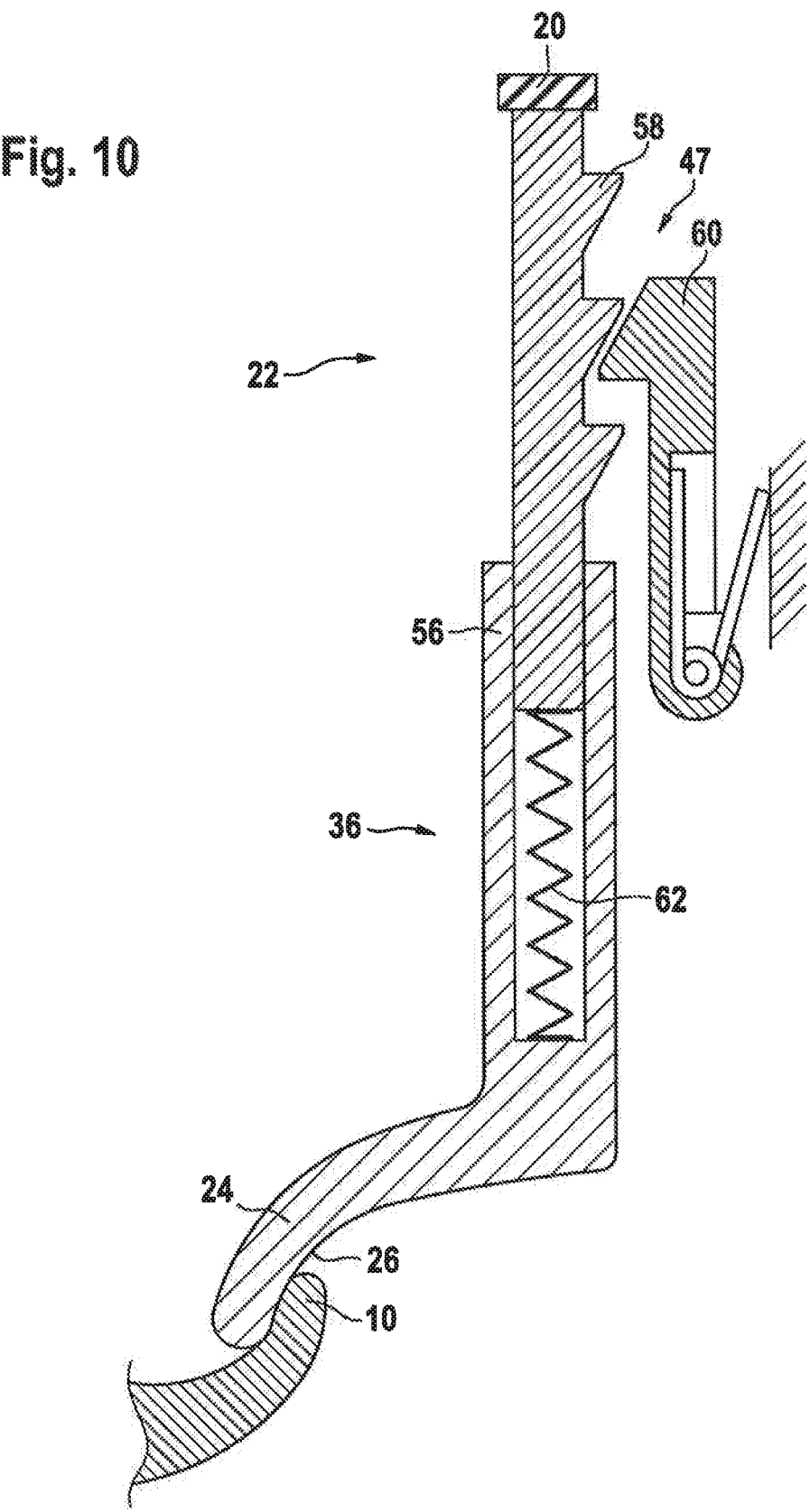
FIG. 10 shows a further alternative form of the bracing means and of the bracing mechanism.

FIG. 10 shows a further bracing mechanism 22. The holding mechanism 47 of this embodiment is similar to that of FIG. 9. The bracing mechanism 22 of FIG. 10 additionally comprises a ratchet device 36. The ratchet device 36 comprises a spring 62 which is arranged in the shaft 56. By means of the spring 62, the shaft 56 is elastically compressible in its extent from the hook portion 26 to the contact portion 20. The contact portion 20 is thus movable further radially inwards, or towards the rim flange 10, even when the hook portion 46 is already resting against the rim flange 10 and is no longer movable further radially inwards. The ratchet device 36 also at the same time forms a pressure limiting device 52 since it limits the pressure with which the bracing means 24 contacts the rim 2, or the rim flange 10, to a limit pressure. As soon as the hook portion 26 is resting against the rim flange 10 and the contact portion 20 further exerts pressure in the radially inward direction, the spring 62 is compressed so that the pressure with which the bracing means 24 rests against the rim flange 10 is limited to the pressure necessary to compress the spring, that is to say the limit pressure of the pressure limiting device 52.

Figure 11:
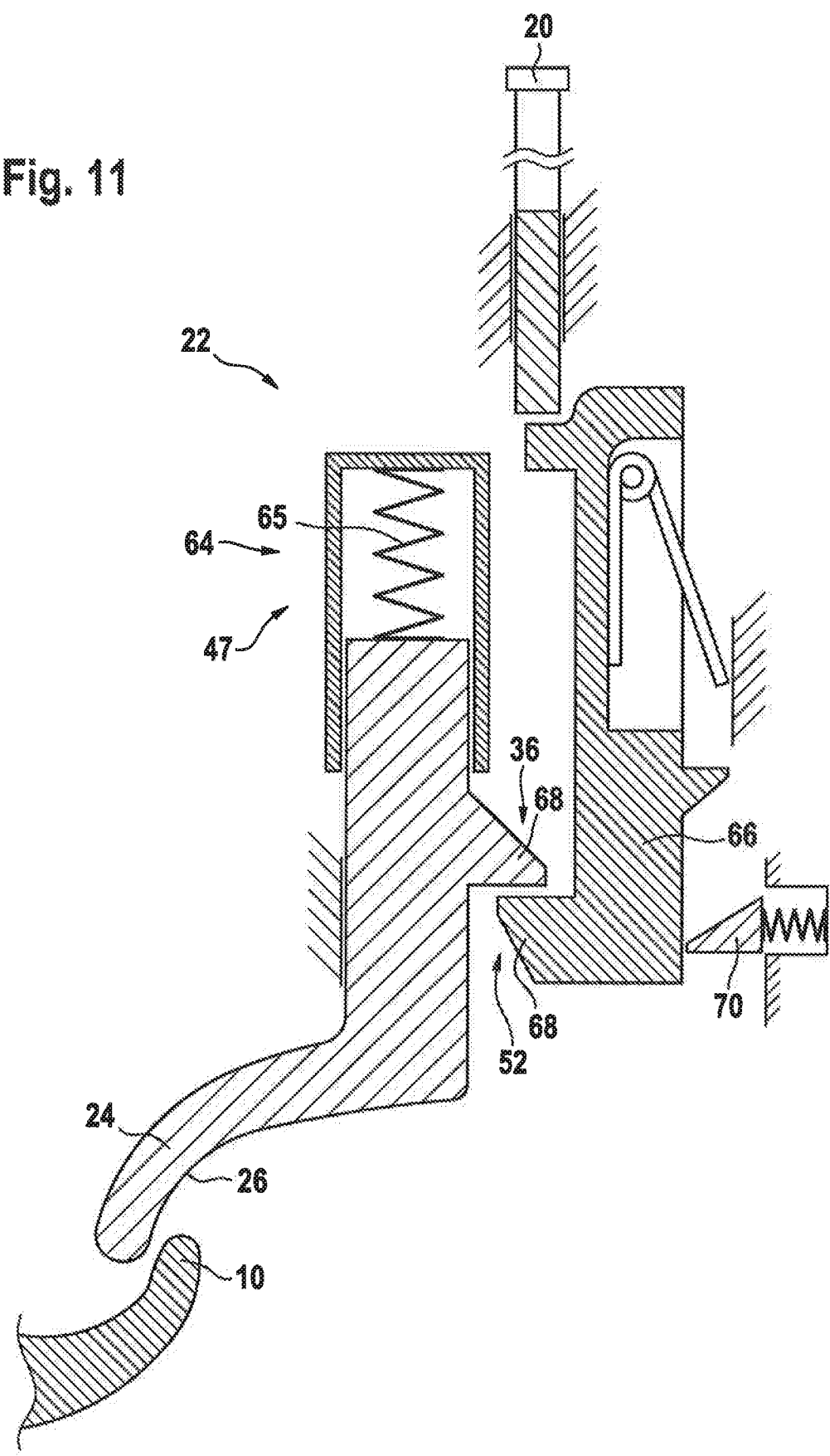
FIG. 11 shows a further alternative form of the bracing means and of the bracing mechanism.

FIG. 11 shows an embodiment variant in which the bracing mechanism 22 comprises a biasing device 64 which biases the bracing means 24 in the direction towards the rim flange 10. Biasing of the bracing means 24 is in the present case spring-based via the spring 65. Also conceivable, however, is an embodiment by means of a pressure medium store, for example pneumatic biasing. A retaining element 66 is thereby so arranged that it holds the bracing means 24 until the contact portion 20 is moved radially inwards by contact with the road surface F and the retaining element 66 is thereby likewise moved radially inwards. If the retaining element 66 is moved radially inwards, it releases the bracing means 24, whereby the bracing means 24, as a result of its biasing, is likewise moved radially inwards and comes into contact with the rim flange 10.

The embodiment of FIG. 11 has a pressure limiting device 52 and a ratchet device 36, which are formed by the two mutually interhooking portions 68 on the shaft 56 of the bracing means 24 and the retaining element 66. If the bracing means 24 is resting against the rim flange 10, the hooking portion 68 which is arranged on the retaining element 66 can move further radially inwards and lift from the hooking portion 68 on the shaft 56 of the bracing means 24. The bracing means 24 then rests against the rim flange 10 with a precisely defined pressure as a result of its spring biasing.

The biasing device 64 of the bracing mechanism 22 in FIG. 11 also forms, together with the spring-mounted projection 70, the holding mechanism 47 which is configured to hold the bracing means 24 in its position when the bracing means 24 is in engagement with its hook portion 26 behind the portion 10 of the rim 2, preferably the rim flange 10.

Figure 12:
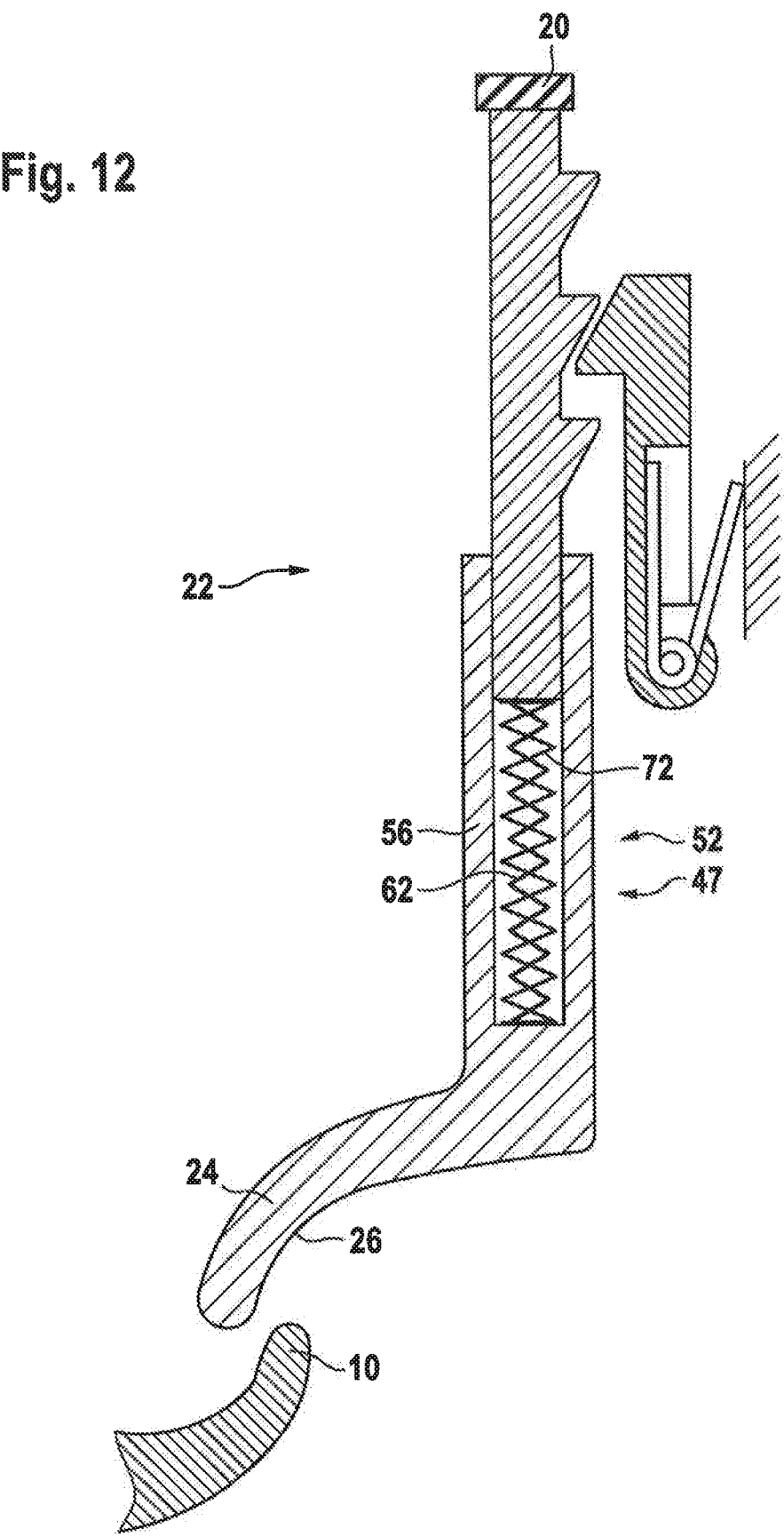
FIG. 12 shows a further alternative form of the bracing means and of the bracing mechanism.

FIG. 12 shows an embodiment variant which is similar to the embodiment of FIG. 10. However, in the embodiment of FIG. 12, the spring 62 of the embodiment of FIG. 10 is supplemented by a plastically deformable element 72. Activation of the ratchet device 36 can thus be adjusted to a higher pressure than the contact pressure (specified by the spring 62 of the holding mechanism 47) with which the hook portion 26 contacts the rim flange 10. The ratchet device 36 is active only when the pressure exerted on the bracing means 24 by the contact portion 20 in the direction towards the rim flange 10 is sufficiently great to plastically deform the plastically deformable element 72. The holding mechanism 47, on the other hand, acts with the force of the spring 62.

Figure 13B:
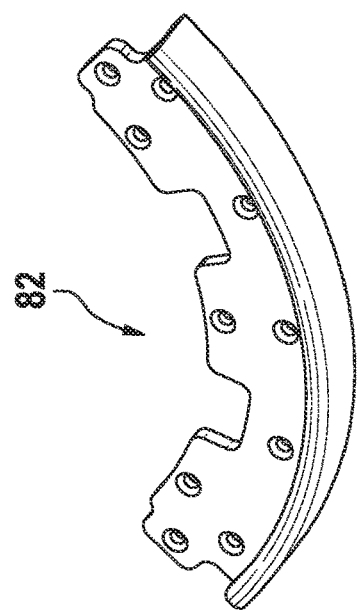
FIG. 13 includes FIGS. 13A and 13B, and shows a further embodiment of an attachment according to the invention.
Figure 13A:
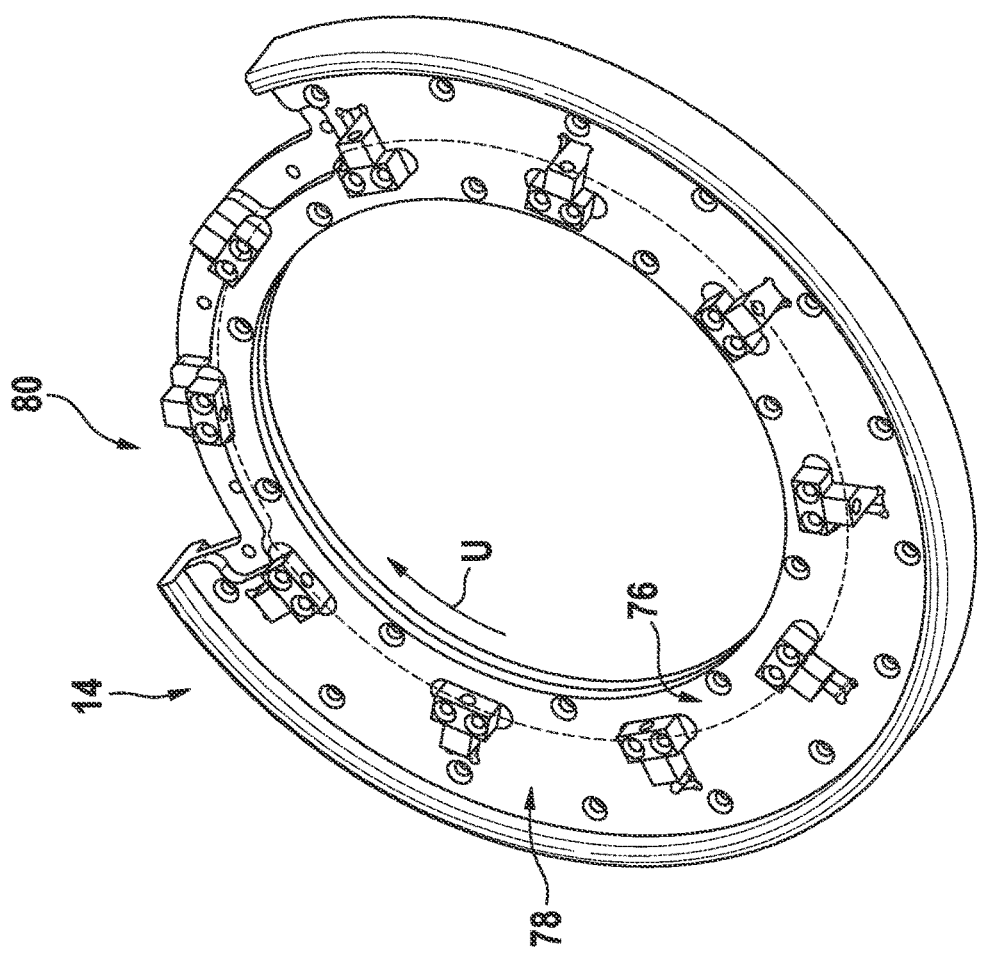

FIG. 13 shows an alternative embodiment of the attachment 14. In the embodiment of FIG. 13, the base body 16 is configured with a mounting portion 76 which is closed in the peripheral direction U, and a tread portion 78. The tread portion 78 is configured with a gap in the peripheral direction U. The tread portion 78 comprises an insert portion 82 which can be received in the gap 80, which insert portion can be received in the gap 80 in such a manner that the tread portion 78 forms the tread surface 18.

FIG. 14 shows an alternative embodiment of the attachment 14 according to the invention, looking at its side that faces the vehicle wheel 1 in the mounted state. A plurality of contact portions 20 are arranged on the attachment 14 distributed around the periphery of the attachment 14 or the tread surface 18. The contact portions 20 are so arranged that, when attached as intended to the vehicle wheel 1, they face the vehicle wheel 1 and can contact the vehicle wheel 1, in particular the rim 2.

The attachment 14 shown in FIG. 14 and the respective bracing mechanisms 22 are so configured that the contact portions 20 contact the rim 2 when the attachment 14 is attached and are thereby actuated. As a result of the actuation of the contact portions 20, the bracing means 24 associated with the respective contact portion 20 are actuated via the respective bracing mechanism 22 and brought into engagement behind the rim flange 10. However, the bracing means 24 can also be so configured and arranged that they engage behind the rim 2 in a portion other than the rim flange 10.

In the embodiment of FIG. 14, the bracing means 24, or bracing mechanisms 22, are so configured that the bracing means 24 engage behind the rim flange 10 in a pivoting manner when they are actuated. The bracing means 24 are shown in detail in FIGS. 15 and 16.

The attachment of FIG. 14 comprises tire displacement devices 84 which are configured to displace the tire 3 away from the rim flange 10 in the axial direction A on attachment of the attachment 14 and on actuation of the bracing means 24. The tire displacement devices 84 are each associated with a bracing means 24 and are formed separately from the bracing means 24. However, a tire displacement device 84 can also be integrated in the bracing means 24.

In the present example, the individual tire displacement devices 84 are each in the form of two projections 86 which are arranged in the peripheral direction U on either side of the respective bracing means 24 with which they are associated. The projections 86 project in the axial direction A from the side of the attachment 14 facing towards the rim 2 and in the present case are in rod form.

The contact portions 20 are coupled via a respective toothed rod portion 88 with a toothing system 90 of the bracing means 24. This will be discussed in greater detail hereinbelow.

The application device 54 of the attachment 14 of FIG. 14 is similar to the application device 54 of the embodiment of FIG. 7A. The application device 54 comprises a hole pattern 58 corresponding to the hole pattern of the bolt circle 4. The attachment 14 can thereby be attached by removing, for example, two bolts of the vehicle wheel 1. The bolts are removed and the attachment 14 is screwed to the vehicle wheel 1 via the bolt circle 4 using two longer screws. Attachment via a device for engagement into the center opening 6, in particular into the groove 12 of the center opening 6, is also conceivable here. Alternatively to the removal of the bolts of the vehicle wheel 1, the attachment device can also comprise a device for gripping a conventional wheel bolt by clamping and/or engaging behind it, which will be discussed in greater detail hereinbelow. Instead of the attachment device 54 shown, the attachment 14 can also be fastened to the vehicle wheel 1 via a tension belt.

Figure 16A:
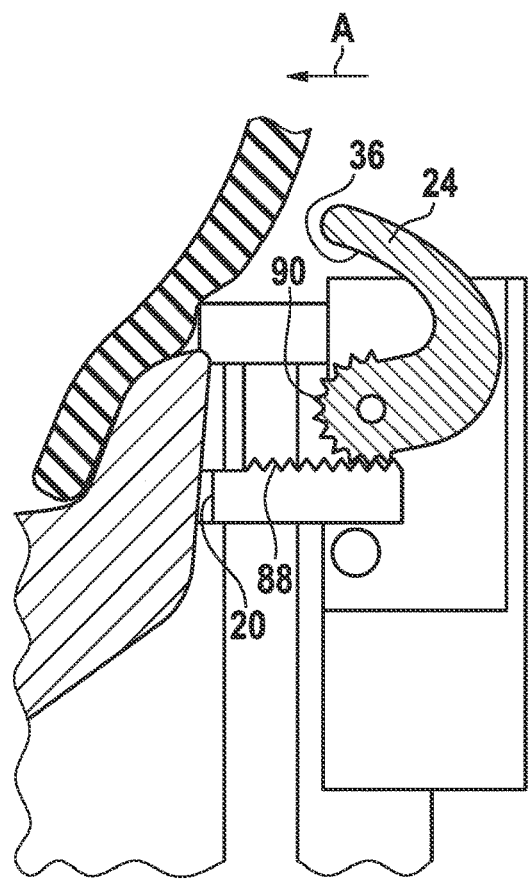
FIG. 16 includes FIGS. 16A and 16B, and shows a detail of the attachment of FIG. 14 in a sectional representation on attachment to the vehicle wheel.
Figure 16B:
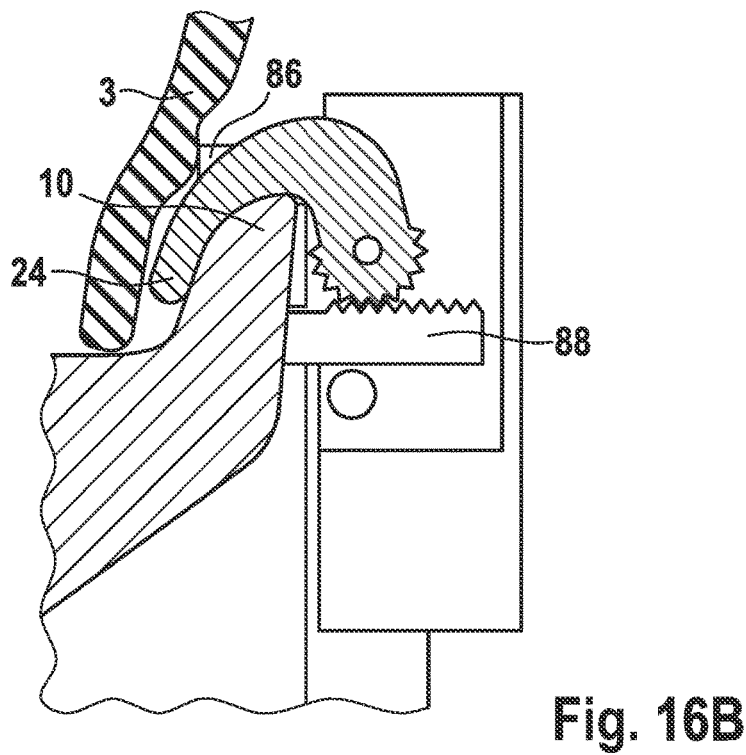

If the attachment 14 is attached to the vehicle wheel 1 via the attachment device 54, the projections 86 of the tire displacement devices 84 contact the tire 3 in the region around the rim flange 10, as shown in FIG. 16A. On attachment of the attachment 14, the attachment moves in the axial direction A towards the vehicle wheel 1. The tire displacement devices 84 thereby displace the tire 3 in the axial direction A away from the rim flange 10. At the same time, the contact portions 20 contact the rim 2 and are thereby actuated. Via the actuation of the contact portions 20, the bracing means 24 are actuated. The contact portions 20 move in the axial direction A into the attachment 14 and in the present case their movement is coupled via the toothed rod portions 88 and the toothing systems 90 with a pivoting movement of the bracing means 24. The bracing means 24 pivot towards the rim 2 in such a manner that they come into engagement behind the rim flange 10. The state in which the attachment 14 is completely fastened to the vehicle wheel 1 is shown in FIG. 16B. The bracing means 24 are in engagement behind the rim flange 10, and the attachment 14 is securely fastened to the vehicle wheel. Coupling of the actuation of the contact portions 20 and the actuation of the bracing means 24 can also be implemented in a different way than via the coupling of the toothed rod portions 88 with the toothing systems 90. In particular, it is advantageous if the bracing mechanisms 22 of the bracing means 24 have a ratchet device 36.

Figure 17A:
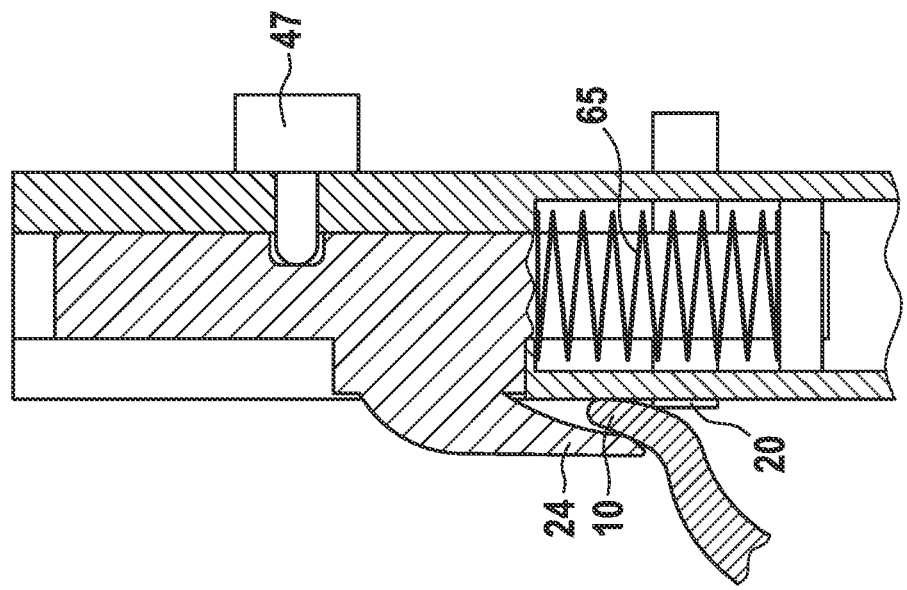
FIG. 17 includes FIGS. 17A and 17B, and shows a further alternative form of the bracing means and of the bracing mechanism.
Figure 17B:
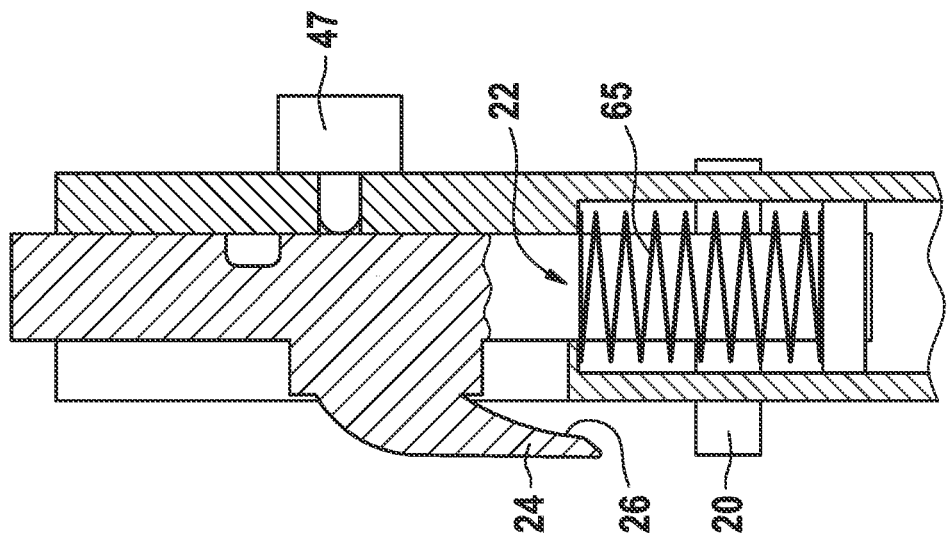

Also in the case of the contact portions 20 which are configured and arranged to be actuated via contact with the rim 2, it is conceivable that the bracing means 24 are associated with a bracing mechanism 22 which is so configured that the bracing means 24 is biased, in particular spring-biased, towards the portion 11 of the wheel 1 and held by a retaining element 66 which releases the bracing means 24 so that the bracing means 24 moves, as a result of the biasing, towards the rim 2, in particular the portion 10 of the rim 2, in particular the hook portion 26 engages behind the portion 11 of the wheel 1 when the contact portion 20 is actuated, in particular subjected to pressure Such an embodiment is illustrated schematically in FIG. 17. If the contact portion 20 is actuated in this embodiment, it releases the spring 65 and the contact portion moves radially inwards and engages behind the rim flange 10. This state is shown in FIG. 17B. In the engaged position, the bracing means 24 is secured by the holding mechanism 47, which holds the hook portion 26 in contact with the rim flange 10. The holding mechanism 47 can be configured to be releasable separately via a specially configured tool, in order to remove the attachment 14 from the vehicle wheel 1.

FIG. 18 shows a further embodiment according to the invention of an attachment 14 in its state attached to the vehicle wheel. The attachment 14 of FIG. 18 can be folded in the middle via the hinge device 32. The construction of the base body 16 corresponds substantially to that of the attachment of FIG. 14. FIG. 18D shows the attachment 14 the vehicle wheel 1 cut along the line d-d. In the state shown in FIG. 18A, the contact portions 20 extend out of the tread surface 18. If the vehicle wheel is then moved by a complete revolution, all the contact portions 20 are contacted by the road surface F and they move into the tread surface 18, whereby the bracing means 24 are actuated and come into engagement behind the rim 2, or behind the rim flange 10.

Figure 19C:
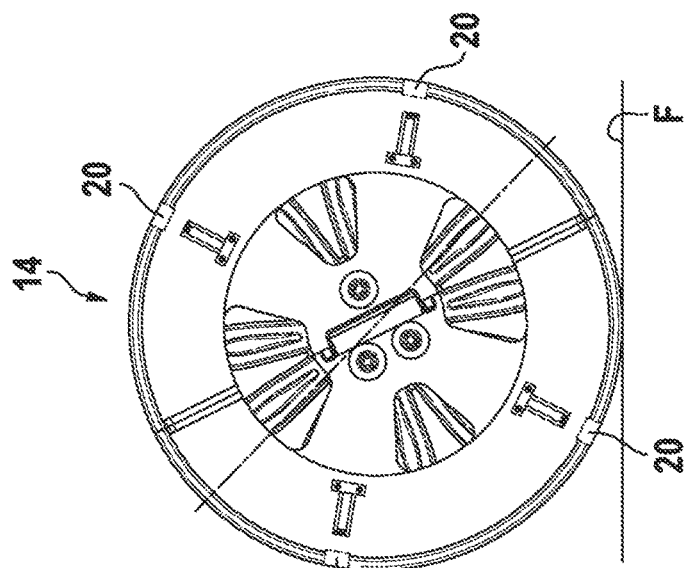
FIG. 19 includes FIGS. 19A-19C, and is a flow diagram of the fastening of an attachment to a vehicle wheel.
Figure 19B:
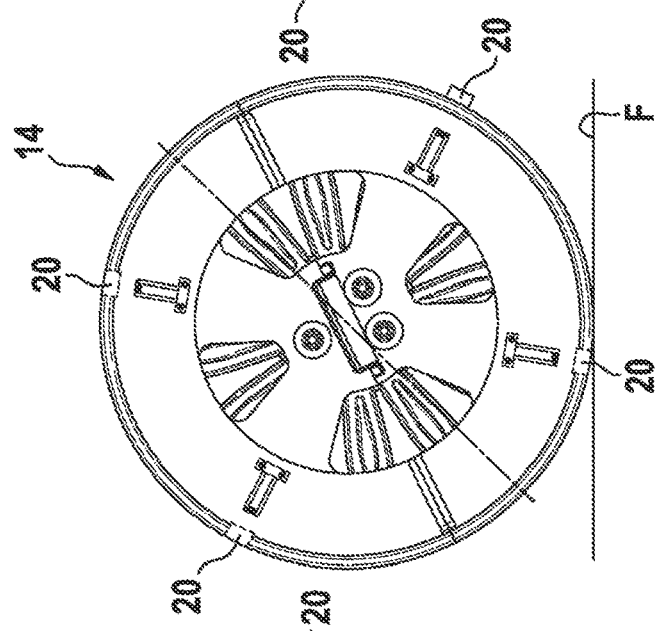
Figure 19A:
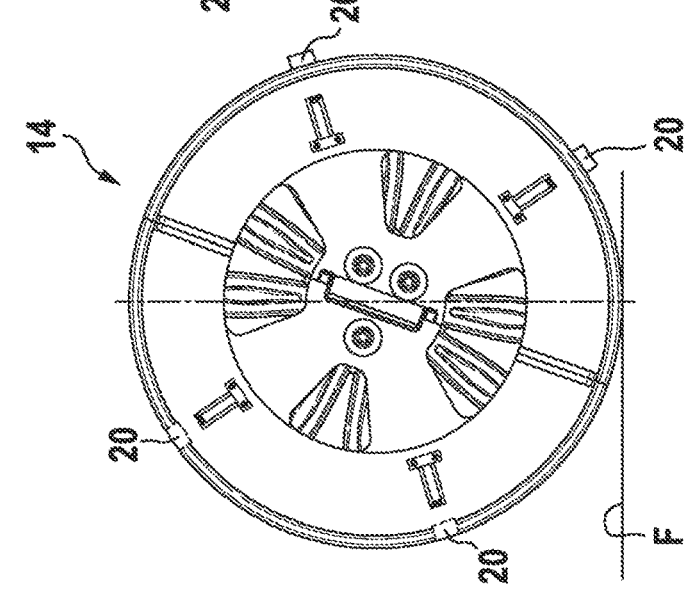

Such a movement and actuation of the contact portions 20 one after the other is shown in FIG. 19 using the example of the attachment 14 of FIG. 18. FIG. 19A shows a state in which two of the contact portions 20 have already contacted the road surface F. In FIG. 19B, a third contact portion 20 and in FIG. 19C all the contact portions 20 have already contacted the road surface F and have been correspondingly actuated.

Figures 20A, 20B:
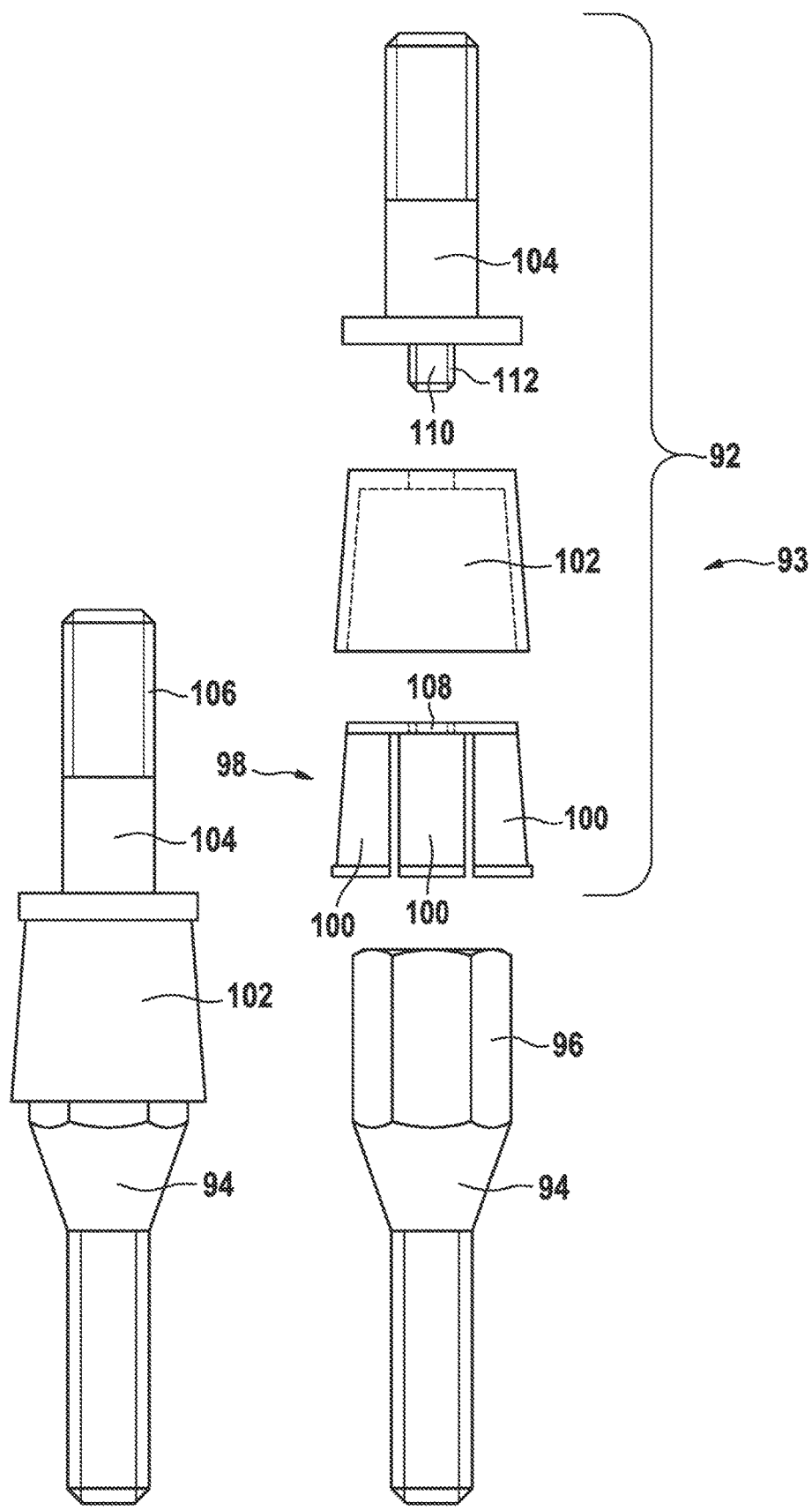
FIG. 20 includes FIGS. 20A and 20B, and shows a device for gripping a conventional wheel bolt by clamping.

FIG. 20 shows an adapter 92 which can be fitted to a conventional wheel bolt 94 of a vehicle wheel 1. The adapter 92 represents a device 93 for gripping a conventional wheel bolt 94 by clamping. The bolt 94 of the vehicle wheel 1 has a head 96 with a hexagon head. The adapter 92 comprises a clamping cap 98 with six clamping arms 100, which are configured and arranged according to the hexagon head of the head 96. The adapter 92 further comprises a clamping sleeve 102 which, when it is pushed onto the clamping cap 98, biases the clamping arms 100 towards one another in such a manner that the head 96 of the wheel bolt 94 is gripped by the clamping arms 100. The adapter 92 additionally comprises a bolt 104, with which the clamping sleeve 102 can be clamped against the clamping cap 98. This clamped state is shown on the left in FIG. 20, while there is shown on the right a representation in which the individual components of the adapter 92 and the wheel bolt 94 are each shown separately from one another. The bolt 104 has an external thread 106. Via the bolt 104 and the external thread 106, an attachment 14 can be attached to the vehicle wheel 1 using a screw nut. However, other forms of the bolt 104 which allow an attachment 14 to be attached are also conceivable. For example, the bolt 104 can carry an internal thread or have bendable arms with hook portions, so that the attachment 14 can, as it were, be pushed over the arms and the arms can then hook behind the attachment 14. It is advantageous if the bolt 104 is so configured that an attachment 14 can be attached to the vehicle wheel 1 in such a manner that it is held in a friction-based or form-fitting manner by means of the bolt 104.

The clamping cap 98 has an internal thread 108 into which a prolongation 110 with an external thread 112 of the bolt 104 can be screwed, so that the clamping cap 98 is pulled into the clamping sleeve 102, whereby the clamping arms 100 are biased towards one another. The screw head 96 of the wheel bolt 94 can thereby be gripped in a friction-based manner.

Figure 21:
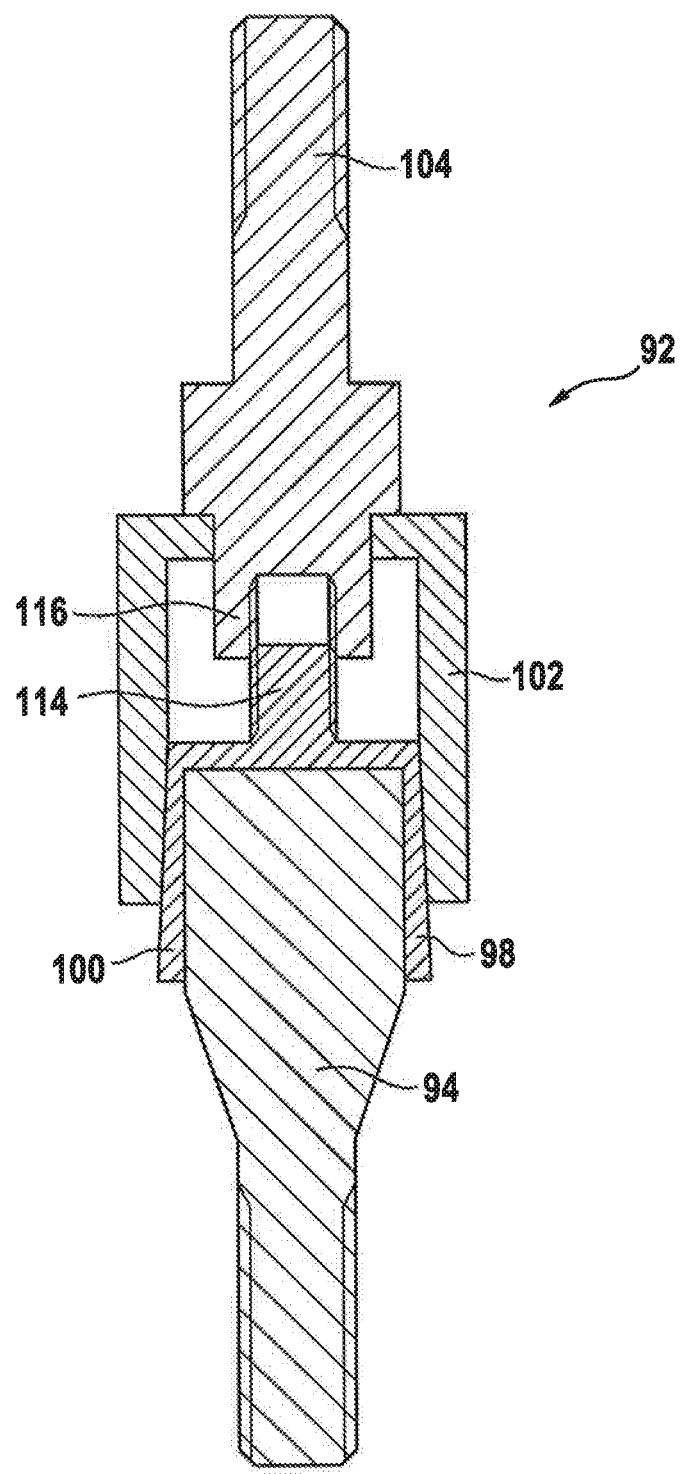
FIG. 21 shows a further device for gripping a conventional wheel bolt by clamping.

FIG. 21 shows an alternative embodiment of the adapter 92. This differs from the embodiment of FIG. 20 in that the clamping cap 98 comprises a prolongation 114 with an external thread and the bolt 104 comprises a prolongation 116 with an internal thread.

The bolt 104 can also comprise hook portions 116 which are able to engage into corresponding recesses 118 on specially adapted wheel bolts 94. Such hook portions 116 are also conceivable in the region of the attachment device 54 of the attachment, so that the attachment 14 can be attached by being clipped, as it were, onto the specially adapted wheel bolts 94.

It is thereby conceivable that the recesses 118, as shown in FIG. 22, are arranged on the outside of the screw head 96, or also, as shown in FIG. 22, are arranged on the inside.

FIG. 24 shows an embodiment of a bracing mechanism 22 and bracing means 24 which is configured similarly to the variant of FIG. 9 but which is additionally configured with a tire displacement device 84. In this variant, the contact portions 20 are arranged, for example, radially outwardly in the tread surface 18, but coupling with contact portions 20 which are arranged on the side of the attachment 14 facing the rim 2 is also conceivable. A leaf spring 120 biases the holding mechanism 47 comprising a hook arm 122.

Preferably at least one of the bracing means 24 has a sensor device which detects when the bracing means 24 is in engagement in the desired manner behind the rim flange 10, or the rim 2. The sensor device can be coupled with a signaling device which delivers a signal via which the driver of the vehicle can identify that the attachment 14 is fastened to the vehicle wheel 1 in the intended position, that is to say the bracing means 24 are in engagement in the desired manner behind the rim 2, or the rim flange 10. The signaling device can be arranged, for example, in the passenger compartment. The signaling device can, however, also be arranged on the attachment 14 itself. The corresponding signal can be delivered, for example, visually, acoustically or haptically.

The attachment can also comprise a device which detects when the vehicle wheel 1 has performed a complete revolution, so that all the contact portions 20 have, or should have, contacted road surface F. It can then be indicated to the driver of the vehicle whether the bracing means have engaged properly behind the rim.

Advantageously, the attachment 14 according to the invention is combined with a vehicle having a tire pressure sensor.

A typical sequence can be, for example, as follows: A damaged tire is detected by a tire pressure sensor via the low pressure.

Once the vehicle has stopped and an attachment 14, or the first peripheral segment 28, has subsequently been attached, (as shown, for example, in FIG. 5, in the folded state), the starting position of the vehicle wheel 1 in question is recorded.

On moving, for positioning of the second peripheral segment 30, half a revolution of the wheel is determined, preferably via the rotational speed sensor, and communicated to the driver of the vehicle by a preferably visual and/or acoustic signal. The contact portions 20 of the first peripheral segment 28 have then contacted the road surface F and the bracing means 24 are in engagement behind the rim flange 10.

Mounting of the attachment can then be completed by bringing the second peripheral segment 30 into its final position and moving the vehicle further so that its contact portions 20 also come into contact with the road surface F.

Correct engagement of the bracing means 24 is detected via sensor devices, and a corresponding signal is delivered to the driver of the vehicle.

It is also conceivable that the bracing means 24 can be fastened to the attachment 14 in different positions 125a to 125d which are offset, in particular radially, relative to one another, so that the attachment 14 can be adapted to different rim sizes. The attachment 14 is thereby preferably so configured that the bracing means 24 can be coupled with the respective contact portions 20 in each of the positions in which they can be attached to the attachment 14. Such an attachment 14 is shown in FIG. 25. In FIG. 25 on the left, four different mutually radially offset positions in which attachment of the bracing means 24 is possible in the present case are characterized by the reference numerals 125a to 125d. In the right-hand representation of FIG. 25, the bracing means 24 are in each case attached in the radially outermost position 125a. The attachment 14 is thereby preferably so designed that the bracing means 24, when attached in positions 125a to 125d, in each case automatically couple with their associated contact portions 20.

As shown in FIG. 26, it is also possible to attach the attachment 14 to the vehicle wheel 1 via special bolts 130, wherein the special bolts 130 are so configured that they replace a conventional wheel bolt 94 and are sufficiently long that the attachment 14 can be attached to the vehicle wheel 1 by means of corresponding nuts 132. The bracing means 24 can then be configured, for example, to be actuatable separately.

Figure 27:
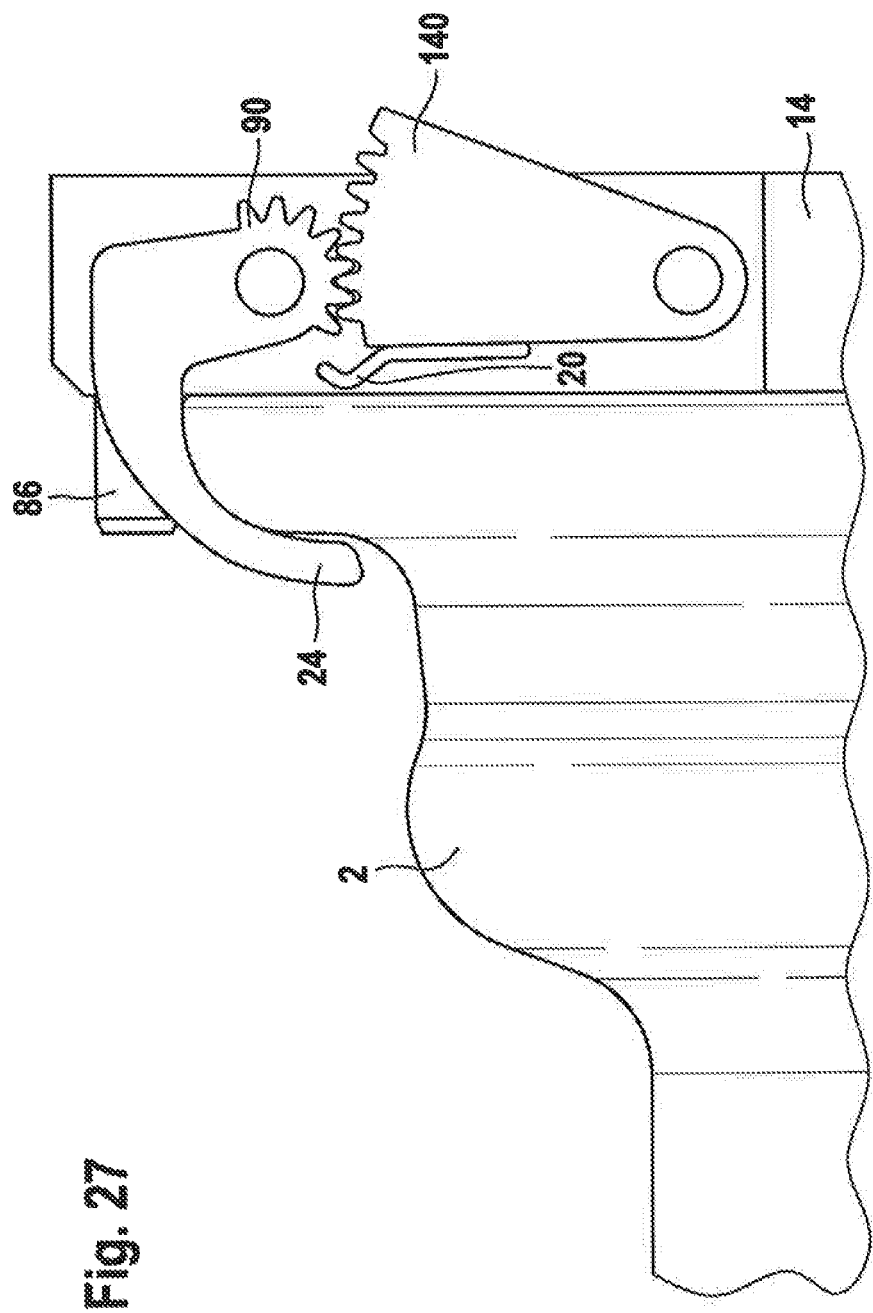
FIG. 27 shows a further embodiment of an attachment according to the invention.

FIG. 27 shows a further alternative embodiment of the attachment 14 in which the contact portion 20 is arranged on the side of the attachment 14 facing the rim 2 and is coupled via a toothed wheel segment 140 with a toothing system 90 of the bracing means 20.

Figure 28:
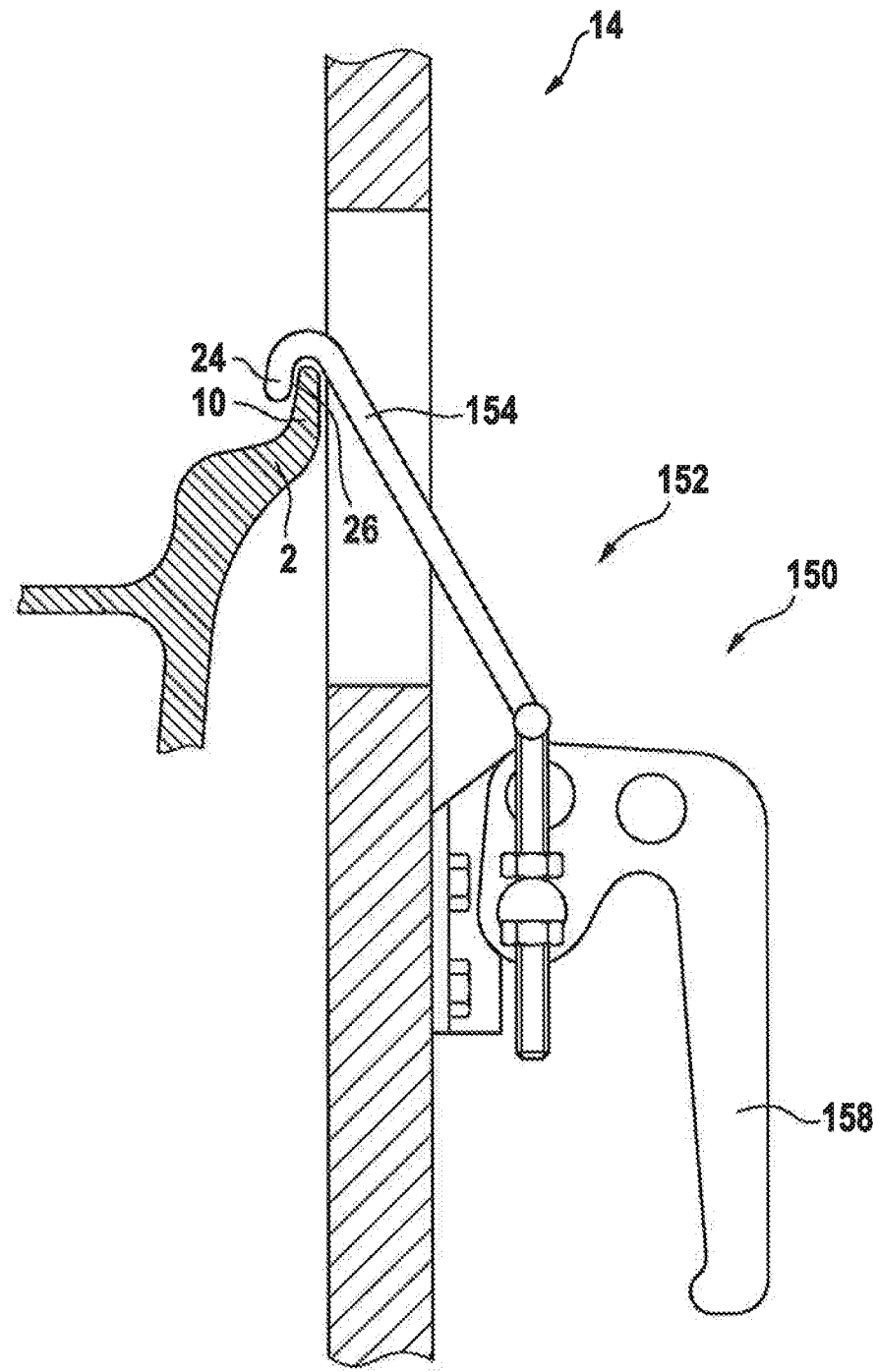
FIG. 28 shows a further embodiment of an attachment according to the invention.

FIG. 28 shows a further alternative embodiment of the attachment 14 in which, instead of the bracing mechanism 22 with the contact portion 20, an actuating device 150 is provided for the respective bracing means 24, with which actuating device the bracing means 24 can be brought into engagement behind the portion 11 of the wheel 1, preferably the rim flange 10. The actuating device 150 is in the form of a lever mechanism 152, in the present case having a lever arm 154, on which the bracing means 24 is arranged, which is operable, for example, manually via a handle 158, which is part of the actuating device 150.

It is also advantageous if the bracing means 24 comprises or comprise, instead of or in addition to the handle 158, an application device (not shown), via which a lever can be applied to the bracing means 24, so that the bracing means 24 is movable or pivotable via that lever onto the portion 11 of the wheel 1, preferably the rim flange 10. Such a lever can form the actuating device 150 just mentioned.

Figure 29C:
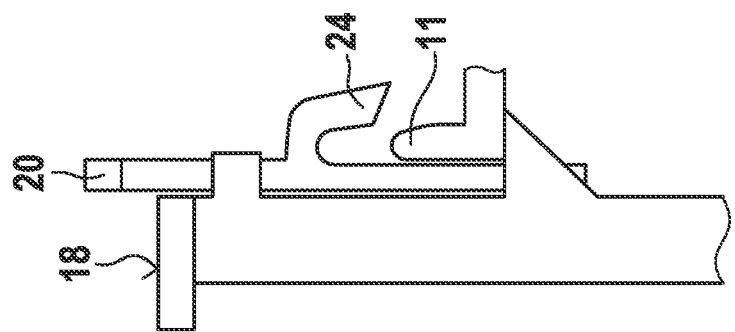
FIG. 29 includes FIGS. 29A-29C, and is an illustration of a portion of a rim, other than the rim flange, which is configured to be engaged behind by bracing means.
Figure 29B:
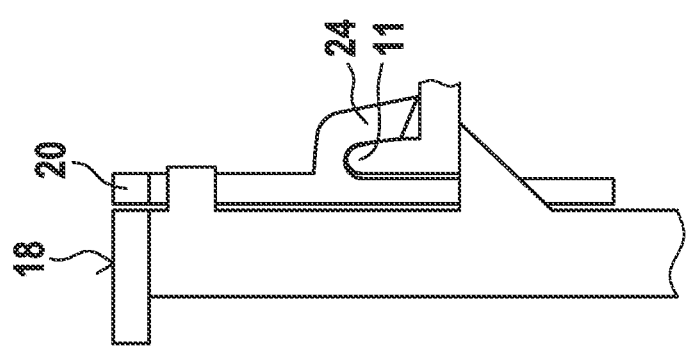
Figure 29A:
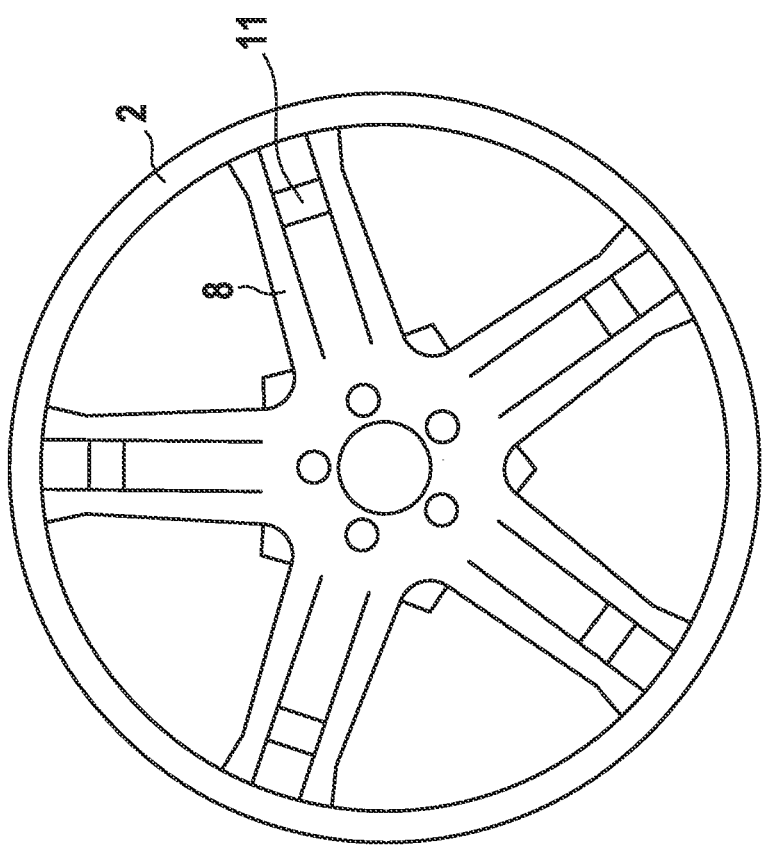

FIG. 29 illustrates schematically a portion 11 of the wheel 1 behind which the bracing means of the attachment can engage, wherein the portion 11 is different from the rim flange 10. Portion 11 is formed in the spokes 8 of the wheel 1.

The invention claimed is:

1. An attachment for a vehicle wheel to allow driving operation with limited tire function, the attachment comprising:
   a base body,
   a tread surface for contacting a road surface,
   at least one bracing apparatus configured to engage with a hook portion behind a portion of a rim of the vehicle wheel, and
   a bracing mechanism having a contact portion, the contact portion configured to actuate the bracing apparatus and to bring the hook portion into engagement behind the portion of the rim upon actuation of the contact portion,
   wherein the contact portion is configured, with the attachment attached to the vehicle wheel and the vehicle wheel rotating, to be actuated by contact with the road surface.

2. The attachment as claimed in claim 1, wherein
   the contact portion is arranged in the tread surface of the attachment,
   and wherein the contact portion in a deployed state extends in a peripheral direction flush with the tread surface of the attachment.

3. An attachment for a vehicle wheel to allow driving operation with limited tire function, the attachment comprising:
   a base body,
   a tread surface for contacting a road surface,
   at least one bracing apparatus configured to engage with a hook portion behind a portion of a rim of the vehicle wheel, and a bracing mechanism having a contact portion, the contact portion configured to actuate the bracing apparatus and to bring the hook portion into engagement behind the portion of the rim upon actuation of the contact portion,
wherein the the contact portion is arranged on a side of the attachment that faces the rim,
and wherein the contact portion is configured to be actuated by contact with the rim as the attachment is attached to the vehicle wheel.

4. An attachment for a vehicle wheel to allow driving operation with limited tire function, the attachment comprising:
a base body,
a tread surface for contacting a road surface,
at least one bracing apparatus configured to engage with a hook portion behind a portion of a rim of the vehicle wheel, and
a bracing mechanism having a contact portion, the contact portion configured to actuate the bracing apparatus and to bring the hook portion into engagement behind the portion of the rim upon actuation of the contact portion,
wherein the bracing mechanism comprises a ratchet device,
and wherein the ratchet device is configured to permit a free movement of the contact portion with the hook portion in engagement behind the portion of the rim.

5. The attachment as claimed in claim 1, wherein the bracing mechanism is so configured that the bracing apparatus is biased towards the portion of the rim and is held by a retaining element which releases the bracing apparatus so that the bracing apparatus moves, as a result of the biasing, towards the rim to cause the hook portion to engage behind the portion of the rim upon actuation of the contact portion.

6. The attachment as claimed in claim 1, wherein the bracing apparatus is coupled with the bracing mechanism by a pressure limiting device which limits a pressure with which the bracing apparatus is urged towards the rim, or with which the bracing apparatus contacts the rim, to a limit pressure.

7. The attachment as claimed in claim 1, wherein the bracing mechanism comprises a holding mechanism configured to hold the bracing apparatus in the position in which the bracing apparatus is in engagement with the hook portion behind the portion of the rim.

8. The attachment as claimed in claim 1, wherein the bracing apparatus has a maximum possible travel of more than one inch.

9. The attachment as claimed in claim 1, wherein the attachment comprises a first peripheral segment and a second peripheral segment,
wherein the second peripheral segment is connected to the first peripheral segment in at least one of a detachable, a pivotable and a displaceable manner.

10. The attachment as claimed in claim 1, wherein the base body comprises a mounting portion , which is closed in a peripheral direction, and a tread portion,
wherein the tread portion is configured in the peripheral direction with a gap and comprises an insert portion configured to be received in the gap in such a manner that the tread portion forms the tread surface.

11. The attachment as claimed in claim 10, wherein the insert portion is at least one of detachable from the tread portion and pivotably or displaceably connected to the tread portion.

12. The attachment as claimed in claim 11, wherein the tread portion, apart from the insert portion, is integrally formed with the mounting portion.

13. The attachment as claimed in claim 1, wherein the attachment comprises an attachment device configured to attach the attachment to the vehicle wheel in such a manner that the attachment can subsequently be fastened to the vehicle wheel, upon movement of the vehicle wheel, by the bracing apparatus actuated by the contact portion of the bracing mechanism.

14. The attachment as claimed in claim 13, wherein the attachment device is configured to attach the attachment in the region of a bolt circle of the vehicle wheel,
and wherein the attachment device comprises at least one of an engagement element configured to engage behind a portion of a center opening of the bolt circle, a screw connection configured to attach the attachment to the bolt circle and a device for engaging behind a spoke of the wheel.

15. The attachment as claimed in claim 13, wherein the attachment device comprises a device for gripping a wheel bolt by at least one of clamping and engaging behind the wheel bolt,
and wherein the device comprises:
a clamping cap having at least two clamping arms,
a clamping sleeve which, when pushed onto the clamping cap, biases the clamping arms towards one another in such a manner that a head of a wheel bolt can be gripped by the clamping arms, and
a bolt with which the clamping sleeve can be clamped against the clamping cap.

16. The attachment as claimed in claim 1, wherein the attachment further comprises:
a plurality of bracing apparatuses distributed in a peripheral direction, and
one of a plurality of contact portions each configured to actuate a respective one of the plurality of bracing apparatuses, or a single contact portion configured to actuate the plurality of bracing apparatuses.

17. The attachment as claimed in claim 1, wherein the hook portion of the bracing apparatus, when seen in an axial direction, is configured to slope radially inwards,
and wherein the bracing apparatus is so configured that the hook portion moves radially inwards when the bracing apparatus is actuated by the contact portion and the bracing apparatus moves towards the rim,
and wherein, by the movement of the hook portion, the attachment is urged in the axial direction towards the rim.

18. An attachment for a vehicle wheel to allow driving operation with limited tire function, the attachment comprising:
a base body,
a tread surface for contacting a road surface,
at least one bracing apparatus configured to engage with a hook portion behind a portion of a rim of the vehicle wheel, and
a bracing mechanism having a contact portion, the contact portion configured to actuate the bracing apparatus and to bring the hook portion into engagement behind the portion of the rim upon actuation of the contact portion,
wherein the attachment comprises a tire displacement device configured to displace a tire, mounted to the vehicle wheel, away from the rim flange in the axial direction on at least one of attachment of the attachment and actuation of the bracing apparatus, and
wherein the tire displacement device is associated with one of the bracing apparatus or each of a plurality of bracing apparatuses.

19. The attachment as claimed claim 18, wherein the tire displacement device is formed separately from the bracing apparatus.

20. The attachment as claimed in claim 18, wherein the tire displacement device comprises at least one projection protruding in an axial direction from a side of the attachment that faces the rim.

21. The attachment as claimed in claim 20, wherein the projection is so configured that, on or after engagement of the bracing apparatus behind the portion of the rim, the projection moves away from the tire.

* * * * *